(12) United States Patent
Sayama et al.

(10) Patent No.: US 7,305,283 B2
(45) Date of Patent: Dec. 4, 2007

(54) ON-VEHICLE ELECTRONIC CONTROL DEVICE

(75) Inventors: Masahiko Sayama, Tokyo (JP); Shouzou Kanzaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 631 days.

(21) Appl. No.: 10/939,405

(22) Filed: Sep. 14, 2004

(65) Prior Publication Data
US 2005/0216135 A1     Sep. 29, 2005

(30) Foreign Application Priority Data
Mar. 29, 2004   (JP)   ............ P2004-095814

(51) Int. Cl.
*G06F 19/00*    (2006.01)
(52) U.S. Cl. .............. 701/1; 701/29; 701/36; 307/10.1
(58) Field of Classification Search .......... 701/1, 701/29, 33, 36; 307/10.1, 10.7; 713/500, 713/502
See application file for complete search history.

(56) References Cited

U.S. PATENT DOCUMENTS

| | | | | |
|---|---|---|---|---|
| 6,144,887 A | * | 11/2000 | Kamiya et al. | 700/79 |
| 6,493,593 B1 | * | 12/2002 | Kamiya et al. | 700/2 |
| 6,879,892 B2 | * | 4/2005 | Matsumoto | 701/29 |
| 7,154,194 B2 | * | 12/2006 | Sayama | 307/43 |
| 7,155,326 B2 | * | 12/2006 | Nagata | 701/36 |
| 7,210,055 B2 | * | 4/2007 | Honda | 713/502 |

FOREIGN PATENT DOCUMENTS

| | | |
|---|---|---|
| EP | 1083475 A1 | 3/2001 |
| JP | HEI. 04-197853 A | 7/1992 |
| JP | HEI. 05-018315 A | 1/1993 |
| JP | 2003-315474 A | 11/2003 |

\* cited by examiner

*Primary Examiner*—Gary Chin
(74) *Attorney, Agent, or Firm*—Sughrue Mion, PLLC

(57) ABSTRACT

An on-vehicle electronic control device improves safety so as to prevent an unnecessary start by means of an arousal timer circuit section. An on-vehicle electronic control device includes a main control circuit section and an arousal timer circuit section. A switching element is held in a closed-circuit operation with an output permitting signal that a watchdog timer circuit generates when a pulse cycle of a watchdog clear signal that a main CPU generates is normal, and thereafter an arousal output is reset in response to a forced OFF command from the main CPU. In the event that an arousal output is not reset, the arousal timer circuit section self-resets an arousal output after a predetermined time period has passed.

13 Claims, 11 Drawing Sheets

100a : ON-VEHICLE ELECTRONIC CONTROL DEVICE
106 : DISPLAY ELEMENT (THREATENING DISPLAY MEANS)
110a : MAIN CONTROL CIRCUIT SECTION
111b : FIRST PROGRAM MEMORY
114a : MAIN POWER SUPPLY CIRCUIT
119 : WATCHDOG TIMER CIRCUIT
120a : TIMER CIRCUIT SECTION
124 : SUB POWER SUPPLY CIRCUIT
PWP : FIRST DRIVE OUTPUT
PWN : SECOND DRIVE OUTPUT
MNT : MONITOR INPUT TERMINAL
FLK : FLASHING DISPLAY OUTPUT

100a : ON-VEHICLE ELECTRONIC CONTROL DEVICE
106 : DISPLAY ELEMENT (THREATENING DISPLAY MEANS)
110a : MAIN CONTROL CIRCUIT SECTION
111b : FIRST PROGRAM MEMORY
114a : MAIN POWER SUPPLY CIRCUIT
119 : WATCHDOG TIMER CIRCUIT

120a : TIMER CIRCUIT SECTION
124 : SUB POWER SUPPLY CIRCUIT
PWP : FIRST DRIVE OUTPUT
PWN : SECOND DRIVE OUTPUT
MNT : MONITOR INPUT TERMINAL
FLK : FLASHING DISPLAY OUTPUT

413b: FORCED STOP COMMAND MEANS
420: START OPERATION COMMAND MEANS

411a: FORCED OPERATION COMMAND MEANS
411b: FORCED STOP COMMAND MEANS
412a, 412b: FORCED OPERATION MONITORING MEANS
413a: OPERATION INSPECTING COMMAND MEANS
415: OPERATION INSPECTING MONITORING MEANS

106 : DISPLAY ELEMENT (THREATENING DISPLAY MEANS)
110b : MAIN CONTROL CIRCUIT SECTION
111d : FIRST SERIAL-PARALLEL CONVERTER
111e : FIRST PROGRAM MEMORY
119 : WATCHDOG TIMER CIRCUIT
121d : SECOND SERIAL-PARALLEL CONVERTER
121e : SECOND PROGRAM MEMORY
FLK : FLASHING DISPLAY OUTPUT
MNT : MONITOR INPUT TERMINAL

811a: FORCED OPERATION COMMAND MEANS
811b: FORCED STOP COMMAND MEANS
812a, 812b: FORCED OPERATION MONITORING MEANS
813a: AROUSAL PRACTICE COMMAND MEANS
      AROUSAL TIME PERIOD SETTING COMMAND
814: MEASUREMENT MEANS
815: START INSPECTING MONITORING MEANS
816: COMPENSATION COEFFICIENT OPERATION MEANS

ON-VEHICLE ELECTRONIC CONTROL DEVICE

BACKGROUND OF THE INVENTION

1. Field of the Invention

The present invention relates to improvement in timer start control under an unmanned state in an on-vehicle electronic control device and, more specifically, to an on-vehicle electronic control device designed to achieve a higher reliability so as to prevent the start due to malfunction.

2. Description of the Related Art

An on-vehicle electronic control device that is constituted of a main control circuit section provided with a microprocessor acting as a main CPU and a timer circuit section is well known.

For example, the Japanese Patent Publication (unexamined) No. 315474/2003 titled "Electronic Control Device and Semiconductor Integrated Circuit" proposes a concept, in which as to a soak timer for detecting a left-time period relative to a preheating control of a coolant, a transpiration detection of fuel or the like, a soak timer covering a wide variety of applications is disclosed to measure a left-time period with a measurement time and a measurement accuracy in compliance with usage.

As a prior art relevant to this invention, the Japanese Patent Publication (unexamined) No. 18315/1993 titled "Automobile Engine Control Device" proposes another concept, in which in a central processing unit (CPU) that is fed with an electric power via an output contact and a power supply circuit of a power supply relay operating when a power supply switch is closed from an on-vehicle battery, the operation of a power supply relay is held when a pulse signal to be generated at the time of normal operation of a CPU, and the CPU executes various initialization processing, and then stops the generation of pulses after the power supply switch is brought in an open circuit thereby performing the de-energization of the power supply relay.

The Japanese Patent Publication (unexamined) No. 197853/1992 titled "Vehicle Theft-Proof Device" proposes a further concept, in which a monitor light-emitting device is brought in flashing, and a flashing cycle thereof is made to be longer as an elapsed time period increases from the start of alerting.

In the above-mentioned electronic control device according to the Japanese Patent Publication (unexamined) No. 315474/2003, a power supply relay is energized with an OR output of output signals from the power supply switch and the soak timer to feed an electric power to the on-vehicle electronic control device. Accordingly, in the case where a power supply relay remains to be switched on due to, e.g., malfunction of the soak timer and the on-vehicle electronic control device is fed with an electric power over a long time period in an unmanned state, an over-discharge of an on-vehicle battery is induced.

Moreover, there is a high risk of on-vehicle current consumers being improperly fed with an electric power in the state that an engine is stopped to induce a burning accident. The above-mentioned electronic control device is of a circuit arrangement unprotected against an unmanned power feed.

SUMMARY OF THE INVENTION

An object of the present invention is to provide an on-vehicle electronic control device capable of improving reliability of a timer start circuit so as to prevent an inadvertent timer start in unmanned state.

An on-vehicle electronic control device according to this invention is constituted of a main control circuit section provided with a microprocessor acting as a main CPU and a timer circuit section measuring a time period in response to a time period measurement start command of the microprocessor acting as the mentioned main CPU. The on-vehicle electronic control device includes a memory storing a set time period command from the mentioned main CPU of the microprocessor acting as a sub CPU provided with a timing counter that measures an elapsed time period from a time period measurement start command of the mentioned microprocessor acting as the main CPU, and first and second reset means erasing a storage content thereof. The mentioned first reset means is forced stop command means for carrying out the reset by means of the mentioned main CPU having been started by the mentioned sub CPU; and the mentioned second reset means is self-reset means that operates when the reset by the mentioned first reset means is not carried out even if a predetermined time period has passed since the start of the mentioned main CPU by means of the mentioned sub CPU, and resets storage of the start by the mentioned sub CPU with a reset timer that is provided in the mentioned timer circuit section.

According to the mentioned on-vehicle electronic control device of this invention, the main CPU determines closed-circuit duration after the generation of a circuit closing drive output, so that a long time period of power feed is not unnecessarily carried out thereby achieving an advantage that the discharge of an on-vehicle battery can be suppressed. Furthermore, in the case where the main CPU does not stop the generation of the circuit-closing drive output, the timer circuit section itself stops the circuit-closing drive output with the reset timer, so that there is an advantage of improving safety.

The foregoing and other objects, features, aspects and advantages of the present invention will become more apparent from the following detailed description of the present invention when taken in conjunction with the accompanying drawings.

DETAILED DESCRIPTION OF THE INVENTION

Embodiment 1

Figure 1:
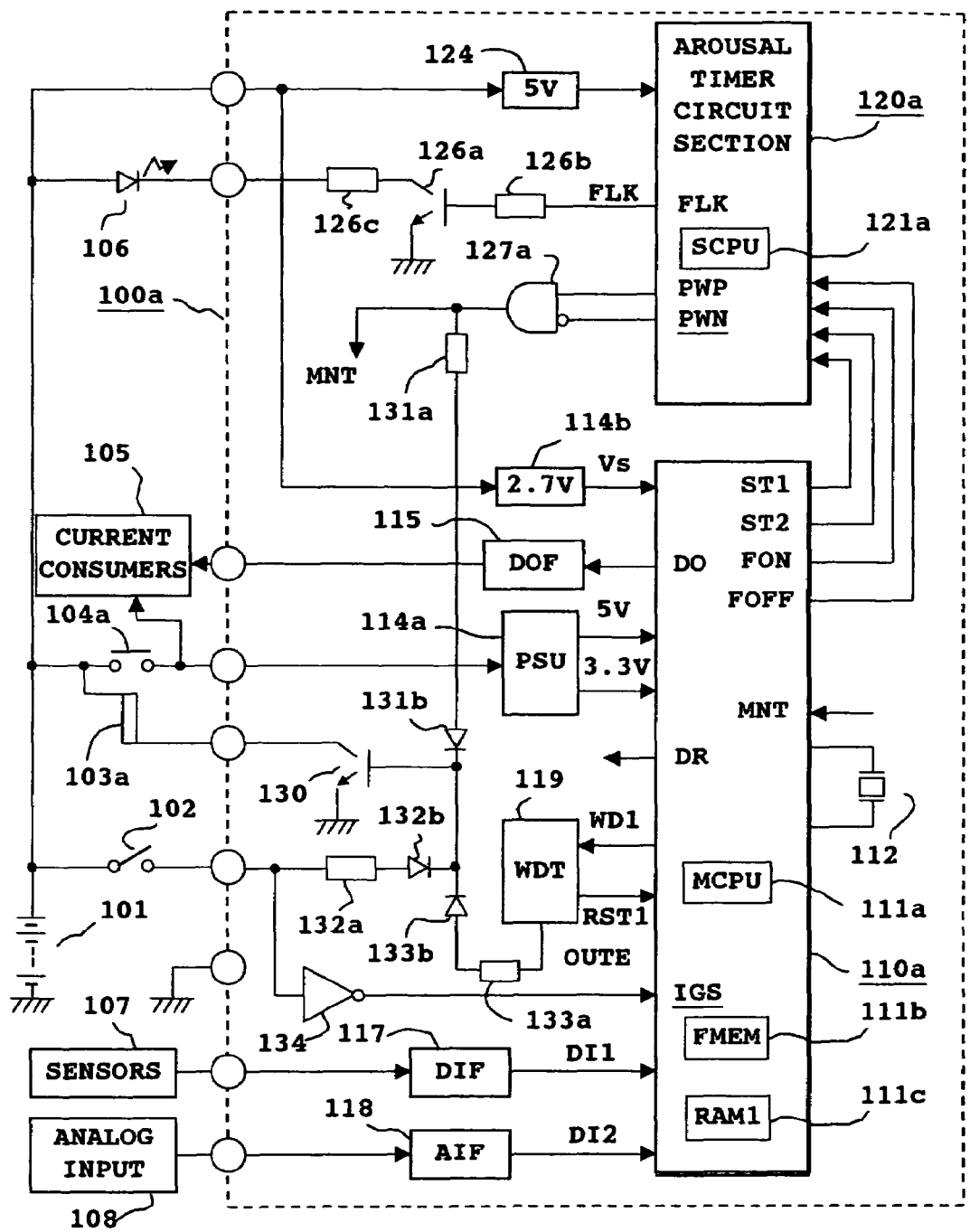
FIG. 1 is a schematic view showing a whole constitution according of a first preferred embodiment of the present invention.

FIG. 1 showing a whole construction of a first preferred embodiment of the present invention is described. With reference to FIG. 1, an on-vehicle electronic control device 100a is constituted of a main control circuit section 110a and a timer circuit section 120a as main components.

First, as an external device to be connected to the on-vehicle electronic control device 100a, there are an on-vehicle battery 101, a power supply switch 102, an electromagnetic coil 103a of a power supply relay and a switching element 104a acting as an output contact thereof, a display device or various current consumers 105 such as actuator, various input sensors 107 performing an ON/OFF operation including a variety of operation switches, an analog input sensor 108, and a display element (threatening display means) 106 such as light-emitting diode.

The main control circuit section 110a includes a main CPU 111a being a microprocessor, a first program memory 111b such as non-volatile flash memory, and a RAM memory 111c for operation processing.

The main CPU 111a operates in synchronization with a reference clock signal transmitted by a reference oscillator 112 using a crystal resonator or a ceramic resonator. A main power supply circuit 114a is fed with an electric power from an on-vehicle battery 101 via the switching element 104a, and supplies a stable voltage of, e.g., DC5V or DC3.3V to the main control circuit section 110a. Further, with respect to the main control circuit section 110a, a sleep power supply circuit 114b is provided to act as a backup power supply for the RAM memory 111c. Although this sleep power supply circuit 114b is directly fed with power from the on-vehicle battery 101 without being via the switching element 104a, the power consumption thereof is of a minute value. An output interface circuit 115 is provided between an output port DO of the main CPU 111a and various current consumers 105, and forms a circuit including an output latch memory and a number of output transistors. When any of the above-mentioned output transistors is brought in conduction, one of the current consumers 105 connected to the conducted transistor is fed with an electric power and driven from the on-vehicle battery 101 via the switching element 104a.

An input interface circuit 117 is connected between various input sensors 107 and an input port DI1 of the main CPU 111a, and forms a circuit including a noise filter and a data selector. An analog input interface circuit 118 includes a noise filter and a multi-channel AD converter, and a digital conversion value of a variety of analog input signals is connected to an input port DI2 of the main CPU 111a. A watchdog timer circuit 119 monitors a pulse width of a watchdog clear signal WD1, being a pulse train that the main CPU 111a generates. When this pulse width comes to be not less than a predetermined value, the watchdog timer circuit 119 generates a reset pulse signal RST1 to reset and restart the main CPU 111a. When a watchdog clear signal WD1 is a normal pulse train, the watchdog timer circuit 119 causes a logic level of an output-permitting signal OUTE to be "H".

The timer circuit section 120a is constituted of a logic circuit operating at a low speed with low power consumption as described later in detail referring to FIG. 3. This timer circuit section 120a operates in response to a start operation command ST1, an operation inspecting command ST2, a forced ON command FON and a forced OFF command FOFF, and generates a flashing display output FLK or first and second drive outputs PWP•PWN. A sub power supply circuit 124 is directly fed with power from the on-vehicle battery 101, and supplies a stable voltage such as DC5V to the timer circuit section 120a at all times. A transistor 126a is driven in conduction via a drive resistor 126b that is connected to a base circuit from a flashing display output FLK that the timer circuit section 120a generates, and drives the display element 106 in a flashing manner via a current-limiting resistor 126c that is connected to a collector circuit.

A logic element 127a generates a circuit-closing drive output signal being a logic level "H" only when a logic level of a first drive output PWP that the timer circuit section 120a generates is "H", and a logic level of a second drive output PWN that the timer circuit section 120a generates is "L". This circuit-closing drive output signal is supplied to a monitor input terminal MNT of the main CPU 111a. In addition, it is also preferable that a PNP-type transistor including a base resistance is employed as a circuit performing an equivalent operation to that of the logic element 127a, an emitter of the transistor is connected to a first drive output PWP, a base circuit is connected to a second drive output PWN, and a collector is connected to a drive resistor 131a. In the case of employing a PNP-type transistor including a base resistance as a circuit performing an equivalent operation to that of the logic element 127a, it becomes an arrangement of a current logic. Consequently, it becomes possible to prevent the malfunction due to the single defect of the logic element 127a, and the malfunction at the time of high-impedance such as the first and second drive outputs PWP•PWN being at a logic level "X".

A transistor 130 is connected to one end of the electromagnetic coil 103a of the power supply relay the other end of which is connected to a positive-side terminal of the on-vehicle battery 101, and driven in conduction via a series circuit of a drive resistor 132a and a diode 132b when a power supply switch 102 is brought in a closed-circuit to energize the electromagnetic coil 103a and cause the switching element 104a acting as an output contact to be in conduction. Further, the transistor 130 is driven in conduction via a series circuit of a drive resistor 133a and a diode 133b with the output-permitting signal OUTE that a watchdog timer circuit 119 generates accompanied by the fact that the switching element 104a comes to be conductive and the main CPU 111a starts the operation. Once the main CPU 111a has started the operation, the switching element 104a performs a self-hold operation even if a power supply switch 102 is in an open circuit.

An interface element 134 is connected so as to input an inverting logic signal IGS to the main CPU 111a responsive to a switching operation of the power supply switch 102. The main CPU 111a carries out, e.g., an evacuation processing of memory information or initialization processing, and then stops the generation of a watchdog clear signal WD1 when detecting that the power supply switch 102 is brought in an open circuit. As a result, a logic level of the output permitting signal OUTE of the watchdog timer circuit 119 comes to be "L", and the transistor 130 becomes non-conductive leading to the interruption of the switching element 104a. Further, it is also preferable that a self-holding drive signal DR is generated from the main CPU 111a instead of the output permitting signal OUTE transmitted by the watchdog timer circuit 119. The transistor 130 is further driven in conduction via a series circuit of a drive resistor 131a and a diode 131b from an output of the logic element 127a. When the timer circuit 102a generates the first drive output PWP at the logic level "H" and the second drive output PWN at the logic level "L", the transistor 130a is brought in conduction, the switching element 104a becomes in a closed circuit, and the main CPU 111a starts the operation.

When the operation of the main CPU 111a has been started by the timer circuit section, the generation of the first drive output PWP and the second drive output PWN, being a circuit-closing drive output from the timer circuit section 120a, is stopped. Instead of this circuit-closing drive output, the operation of the power supply relay is maintained with the output permitting signal OUTE that becomes active when a generation cycle of a watchdog clear signal that the main CPU 111a generates is not more than a predetermined time period, or a self-holding drive signal DR that the main CPU 111a generates.

It is also preferable that a circuit closing drive output continues to be generated even after the start-up of the main CPU 111a by means of the timer circuit section, and the output of a circuit closing drive output is stopped by the main CPU 111a accompanied with the end of operation started by the timer.

Figure 2:
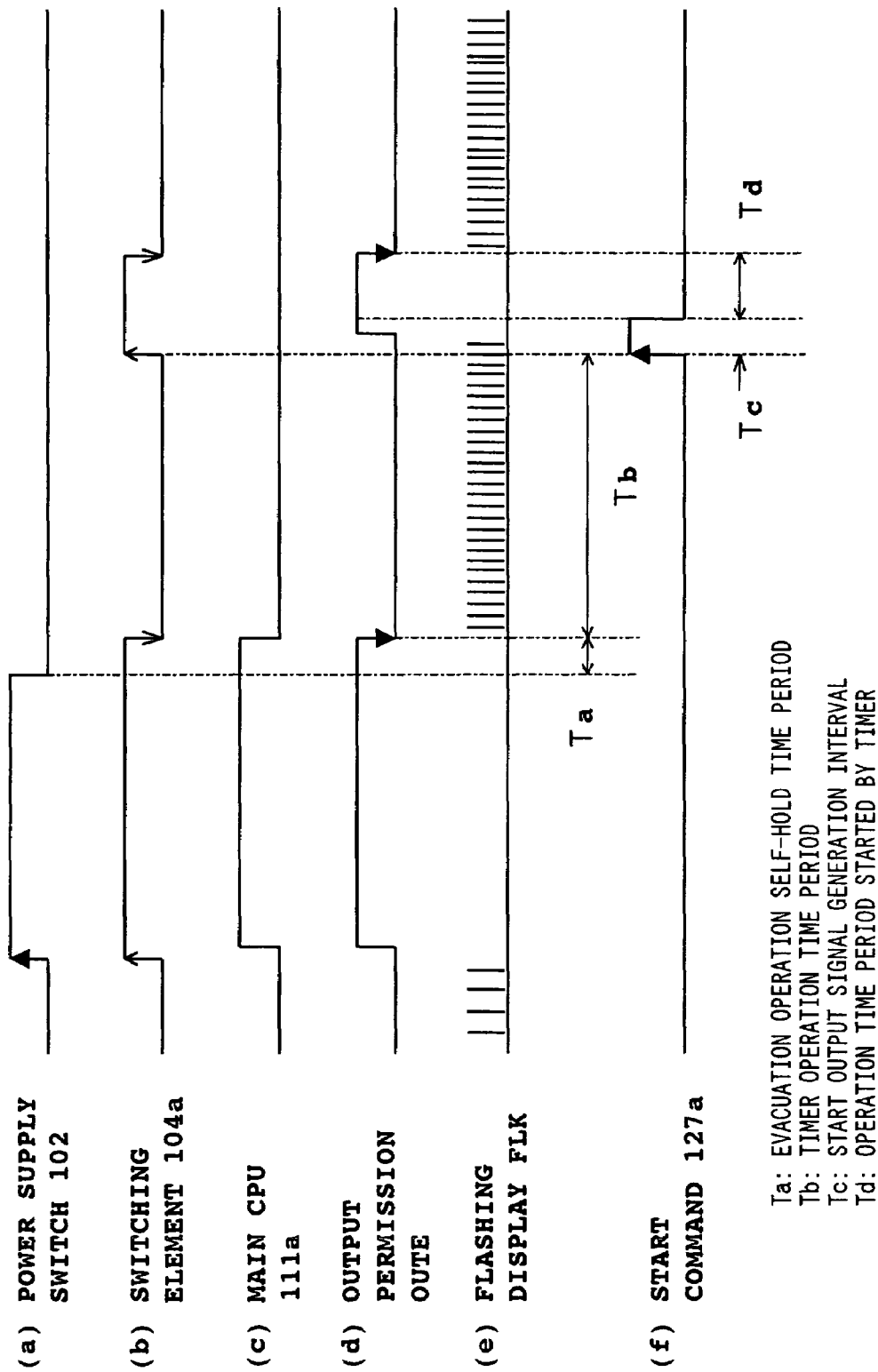
FIG. 2 is an operation time chart of a power supply circuit of FIG. 1.

With reference to FIG. 2, an operation time chart of the power supply circuit of FIG. 1, upon occurrence of a closed circuit of the power supply switch 102 shown in FIG. 2(a) (at a logic level "H"), the switching element 104a shown with FIG. 2(b) is brought in a closed circuit (at a logic level "H"), and the main CPU 111a starts the operation as shown in FIG. 2(c). As a result, a watchdog clear signal WD1, being a pulse train that main CPU 111a generates, is generated. The watchdog timer circuit 119 generates the output-permitting signal OUTE as shown in FIG. 2(d). During the time period when the main CPU 111a is fed with an electric power, a flashing display output FLK is stopped as shown in FIG. 2(e).

Responsive to an open circuit of the power supply switch 102, the main CPU 111a stops the operation, and a watchdog clear signal WD1 is stopped after an evacuation operation time period Ta has passed, whereby the generation of the output permitting signal OUTE is also stopped, the switching element 104a is brought in an open circuit, and the power supply to the main CPU 111a is interrupted. However, the timer circuit section 120a is fed with power on a steady basis from the sub power supply circuit 124 to continue the operation, and a flashing display output FLK generates an ON/OFF output with a command of the main CPU 111a. Additionally, during an evacuation operation time period Ta, a variety of evacuation processing required to serve by an on-vehicle electronic control device such as stores in a non-volatile data memory, not shown, various learning information, error history information or the like having been stored in the first RAM memory 111c, is carried out according to contents in the first program memory 111b. Further, the next start operation command signal ST1 is supplied to the timer circuit section 120a. Furthermore, it is also preferable that the main CPU 111a detects that the rotation of an engine is stopped, and the main CPU 111a supplies a start operation command signal ST1 to the timer circuit section 120a.

Then, as shown in FIG. 2(f), when the timer circuit section 120a generates the positive and negative circuit closing drive outputs PWP•PWN, an output logic level of the logic element 127a comes to be "H", and the transistor 130 is brought in conduction resulting in a closed circuit of the switching element 104a. As a result, the main CPU 111a is started by the timer circuit section, and generates the output-permitting signal OUTE to maintain the conduction through the transistor 130. Further, a circuit-closing drive output is stopped with a command from the main CPU 111a. When the operation started by the timer has completed during a time period Td, the operation of the main CPU 111a is stopped, and the output-permitting signal OUTE is stopped resulting in the interruption of the switching element 104a. In the case where the main CPU 111a generates the next start operation command ST1 during the time period Td of the operation started by the timer, the same operation will be performed in the course of time. However, in the case where the next start operation command is not given, the timer will not start the operation again.

Figure 3:
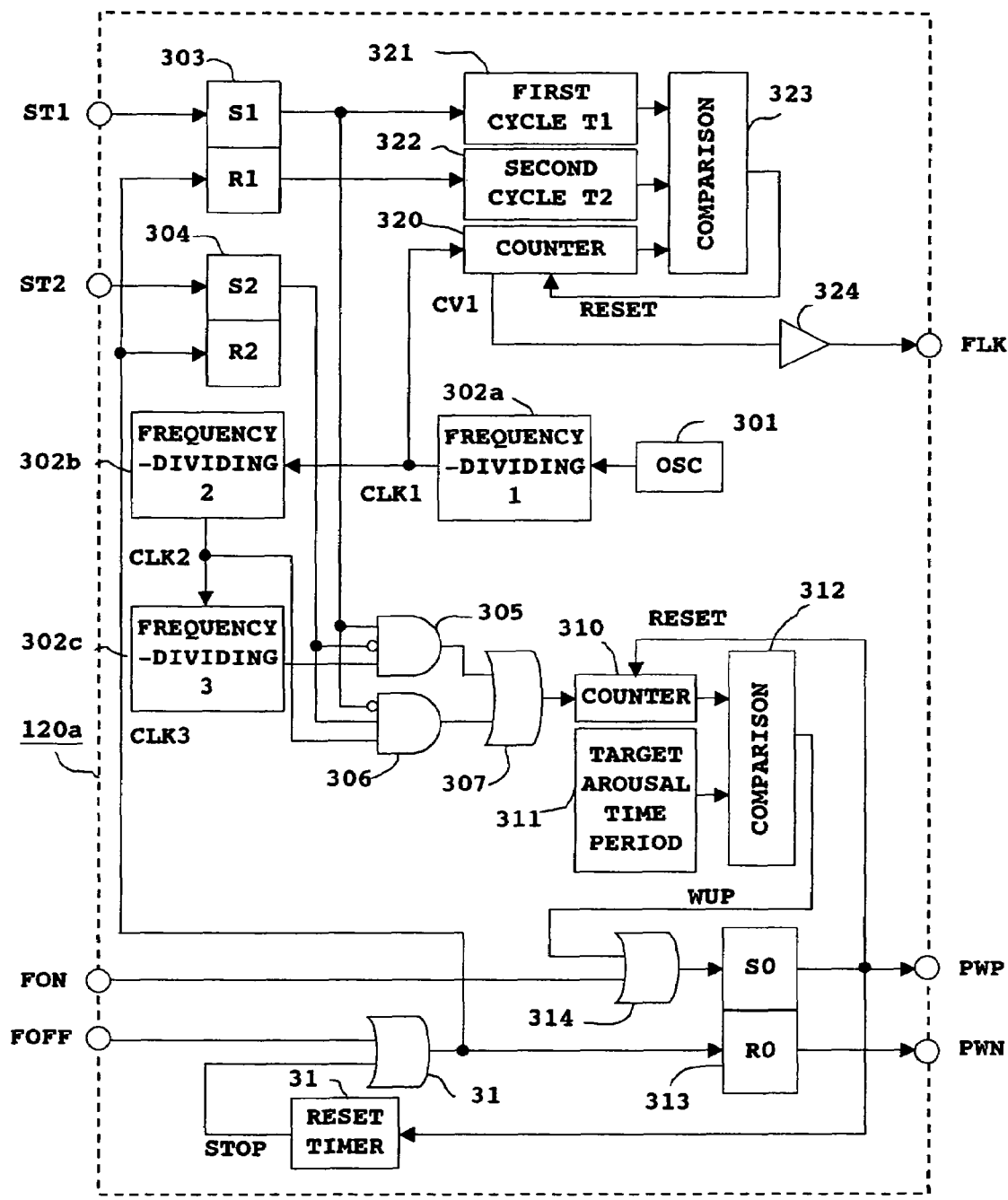
FIG. 3 is a control block diagram of a timer circuit section of FIG. 1.

With reference to FIG. 3, being a control block diagram of the timer circuit section 120a of FIG. 1, a clock signal that a timing clock signal generation circuit 301 generates is frequency-divided in a first dividing circuit 302a to generate a first clock signal CLK1 having a cycle of, e.g., 0.1 second. The clock signal is further frequency-divided in a second dividing circuit 302b to generate a second clock signal CLK2 having a cycle of, e.g., 1 second. The clock signal is further frequency-divided in a third dividing circuit 302c to generate a third clock signal CLK3 having a cycle of, e.g., 1 minute. A timer start command storage circuit 303 is constituted of, for example, a flip-flop including a set input S1 and a reset input R1, and stores the generation of an start operation command ST1 transmitted by the main CPU 111a.

An operation inspecting command storage circuit 304 is constituted of, for example, a flip-flop including a set input S2 and a reset input R2, and stores the generation of an operation inspecting command ST2 generated by the main CPU 111a. An AND element 305 generates an AND output of logic inverting outputs of a storage output from the timer start command storage circuit 303 and a storage output from the operation inspecting command storage circuit 304, and a third clock signal CLK3. Further, AND element 306 generates an AND output of logic inverting outputs of a storage output from the operation inspecting command storage circuit 304 and a storage output from the timer start command storage circuit 303, and a second clock signal CLK2. The outputs from the AND elements 305 and 306 are connected to an input of an OR element 307.

A timing counter 310 is arranged so as to count an output signal from an OR element 307. This timing counter 310 performs the counting at a low speed with a third clock signal CLK3 during a storage output from the timer start command storage circuit 303 being generated; and performs the counting at a high speed with a second clock signal CLK2 during a storage output from the operation inspecting command storage circuit 304 being generated. A constant corresponding to a value obtained by dividing a set time period from the main CPU by a periodic time of a third clock signal CLK3 is stored in a timer start time period setting memory 311. Comparison determination output means 312 compares a current value of the timing counter 310 with a constant that is stored in the timer start time period setting memory 311, and generates an arousal output signal WUP when both of them are in coincidence. Output logic processing means 313 is constructed of a flip-flop including a set input SO and a reset input RO. The set output comes to be a first drive output PWP, and the reset output comes to be a second drive output PWN.

An OR element 314 sets output logic processing means 313 with an OR output of an arousal output signal WUP that the comparison determination output means 312 and a forced ON command FON that the main CPU 111a generates. A current value of the timing counter 310 is reset with a set output from the output logic processing means 313. An OR element 315 resets the output logic processing means 313 with an OR output of a stop signal that the later-described reset timer 316 generates and a forced OFF command FOFF that the main CPU 111*a* generates; and resets the timer start command storage circuit 303 and the operation inspecting command storage circuit 304.

A reset timer 316 starts timing accompanied by the generation of a set output from the output logic processing means 313, and generates a stop signal STOP after a predetermined limit time period has passed to reset the output logic processing means 313, the timer start command storage circuit 303 and the operation inspecting command storage circuit 304.

Flashing display output means 320 is constituted of a counter for counting a generation pulse of a first clock signal CLK1. A first periodic time T1 is stored in a first memory 321, and this first memory 321 is selected and used when the timer start command storage circuit 303 generates a set output. A second periodic time T2 (>T1) is stored in a second memory 322. This second memory 322 is selected and used when the timer start command storage circuit 303 generates a reset output. A comparison circuit 323 compares a current value of the counter acting as flashing display output means 320 with a first periodic time T1 or a second periodic time T2, and resets a current value of the counter acting as flashing display output means 320 to 0 whenever they are in coincidence as a result of comparison. A gate element 324 is constituted of an AND element of which inputs are a current value output CV1 that stands at a logic level "H" when a current value of the counter acting as flashing display output means is 1, and an inverting logic signal IGS (refer to FIG. 1) that stands at a logic level "L" when the power supply switch 102 is brought in a closed circuit. An AND output thereof is a flashing display output FLK.

In addition, a periodic time of a first clock signal CLK1 is, for example, 0.1 second; while a first periodic time T1 to be stored in the first memory 321 is, for example, 20 corresponding to 2 seconds, and a second periodic time T2 to be stored in the second memory 322 is, for example, 30 corresponding to 3 seconds. In this case, when the timer start command storage circuit 303 is set to be in the state of waiting for the start-up by the timer circuit section, a flashing display output FLK repeats the operation of ON for 0.1 second and OFF for 1.9 seconds. However, when the timer start command storage circuit 303 is not reset, a flashing display output FLK repeats the operation of ON for 0.1 second and OFF for 2.9 seconds. Nevertheless, when the power supply switch 102 is in a closed circuit, a flashing display output FLK is stopped by the action of a gate element 324 to be fixed at a logic level "L".

Figure 4:
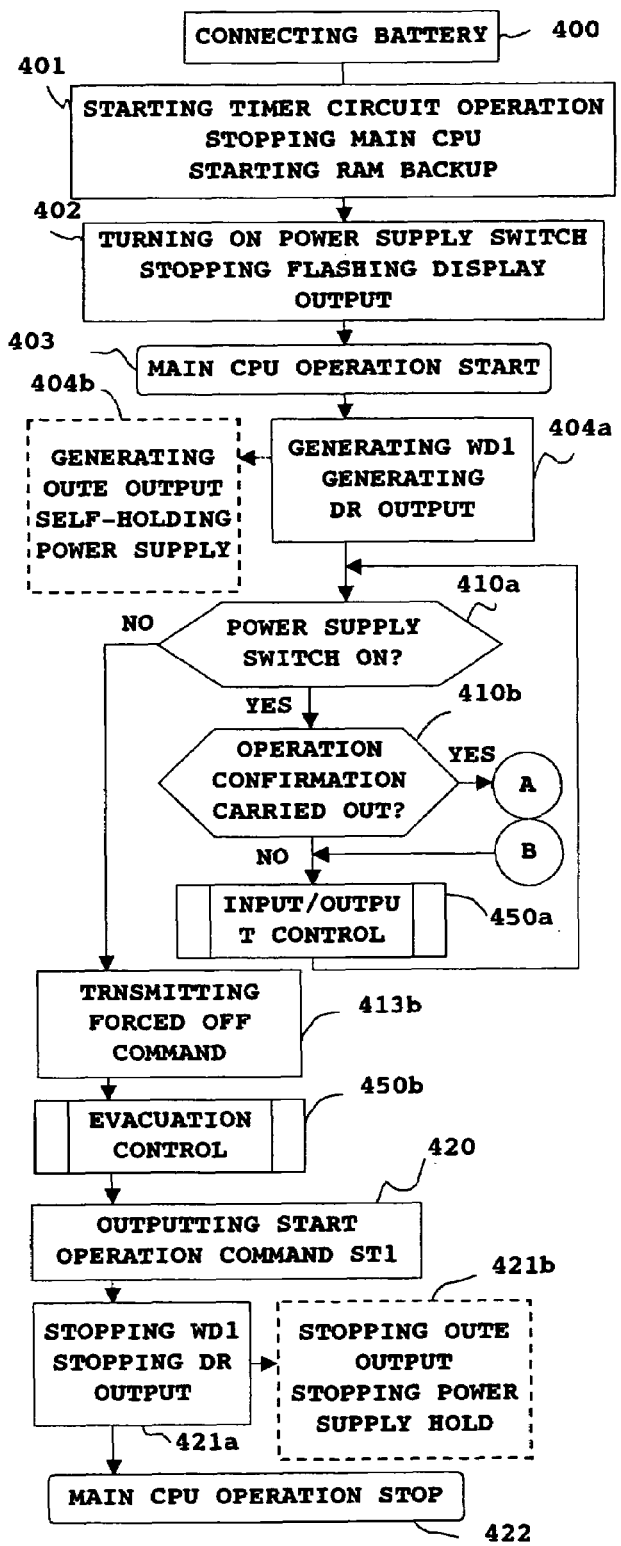
FIG. 4 is an explanatory flowchart of the first half operation of FIG. 1.
Figure 5:
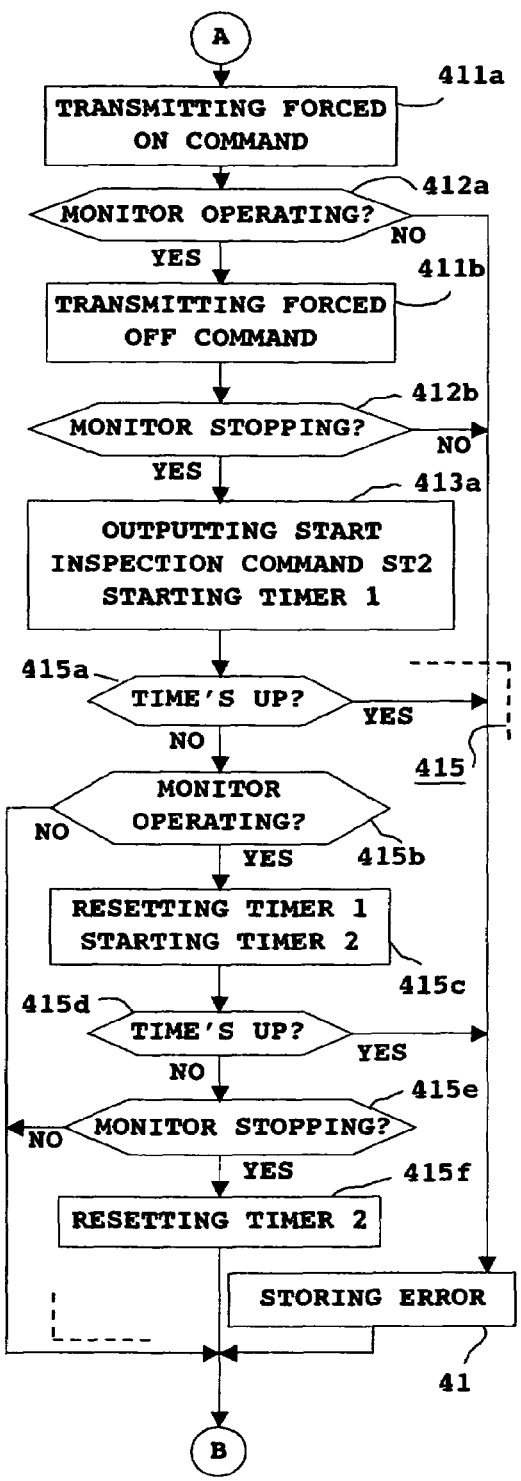
FIG. 5 is an explanatory flowchart of the first half operation of FIG. 1.

With reference to FIGS. 4 and 5, being a flowchart for explaining the first half operation of the main CPU 111*a* of FIG. 1, when the on-vehicle electronic control device 100*a* is connected to the on-vehicle battery 101 in Step 400, in the subsequent Step 401, the timer circuit section 120*a* starts the operation, and a flashing display output FLK of a second periodic time T2 is generated. Further, the main control circuit section 110*a* comes to a state capable of holding the storage of the first RAM memory 111*c* by means of a sleep power supply circuit 114*b*. However, the main CPU is still in the stop state. Then, when the power supply switch 102 is turned on in Step 402, the flashing display output FLK is stopped by the action of the gate element 324 of FIG. 3. However, the transistor 130 of FIG. 1 is brought in conduction, the electromagnetic coil 103*a* is energized, the output contact 104*a* is in a closed circuit, and the power feed to the main control circuit section 110*a* is started. In the subsequent Step 403, the main CPU 111*a* starts the operation.

Step 404*a* operates subsequently to Step 403, and generates a watchdog clear signal WD1 or a self-holding drive signal DR. Accompanied by the generation of a watchdog clear signal WD1, as shown with Block 404*b*, the watchdog timer circuit 119 generates the output-permitting signal OUTE, and the conduction through the transistor 130 is maintained. Accordingly, the energization of the electromagnetic coil 103*a* is kept even if the power supply switch 102 is in an open circuit.

In Step 410*a* operating subsequent to Step 404*a*, it is determined whether or not the power supply switch 102 continues to be in a closed circuit by monitoring an inverting logic signal IGS. In the case where the power supply switch 102 is in a closed circuit, the program proceeds to Step 410*b*. In the case where the power supply switch 102 is in open circuit, the program proceeds to Step 413*b*. In Step 410*b*, it is determined whether or not an operation confirmation test of the timer circuit section 120*b* is carried out. When the operation confirmation test is carried out, the program proceeds to Step 411*a*. When the operation confirmation test is not carried out, the program proceeds to Step Block 450*a*.

Furthermore, the determination in Step 410*b* is executed substantially at regular intervals during a period when an engine speed is low and the main CPU 111*ab* has a margin of response supposing that the on-vehicle electronic control device 100*a* is an engine control device.

In Step 411*a*, a forced ON command FON is generated. In the subsequent Step 412*a*, a monitor input terminal MNT is monitored, thereby determining whether or not first and second drive outputs are normally operated. In the case of any operation error, the program proceeds to Step 417. In the case of normal operation, the program proceeds to Step 411*b*.

In Step 411*b*, a forced OFF command FOFF is generated. In the subsequent Step 412*b*, a monitor input terminal MNT is monitored, thereby determining whether or not first and second drive outputs PWP•PWN have normally stopped the operation. In the case of stop error, the program proceeds to Step 417. In the case of normal stop, the program proceeds to Step 413*a*.

In addition, the operation of the timer circuit section 120*a* in response to the forced ON command FON or the forced OFF command FOFF is as shown in FIG. 3. At the arousal operation, a first drive output PWP is at a logic level "H", and a second drive output PWN is at a logic level "L", whereby a logic level of a monitor input signal, being an output from the logic element 127*a* of FIG. 1, comes to be "H".

In Step 413*a*, an operation inspecting command ST2 is generated; and a timer 1 that is Time's UP in a time period rather longer than an operation inspecting time period is started. In the subsequent Step 415*a*, it is determined whether or not the timer 1 is Time's Up. In the case where the timer 1 is Time's Up, the program proceeds to Step 417. In the case where the timer 1 is not Time's Up, the program proceeds to Step 415*b*.

In Step 415*b*, a monitor input terminal MNT is monitored, thereby determining whether or not first and second drive outputs PWP•PWN have been generated. In the case where these first and second drive outputs PWP•PWN have not been generated yet, the program goes through Step Block 450*a* and recirculates to return to Step 415*a*. In the case where an arousal output signal is generated, the program proceeds to Step 415*c*.

Additionally, accompanied by the generation of an operation inspecting command ST2, the timing counter 310 shown in FIG. 3 counts the number of second clock signals CLK2, thereby operating at a high speed and reaching a time period set by the main CPU in a short time period to generate an output signal WUP.

In Step 415c, the timer 1 having been started in Step 413a is reset; and a timer 2 that is Time's Up in a time period rather longer than a set time period of the reset timer of FIG. 3 is started. In Step 415d, it is determined whether or not the timer 2 is Time's Up. In the case of Time's Up, the program proceeds to Step 417. In the case of not being Time's Up, the program proceeds to Step 415e. In Step 415e, a monitor input terminal MNT is monitored, and it is determined whether or not first and second drive outputs PWP•PWN are stopped. In the case where these first and second drive outputs PWP•PWN are not stopped, the program goes through Step Block 450a and recirculates to return to Step 415d. In the case where a circuit-closing drive output is stopped, the program proceeds to Step 415f. In Step 415f, the timer 2 having been started in Step 415c is reset, and thereafter the program proceeds to Step Block 450a.

In addition, Step Block 415 consisting of Step 415a to Step 415f functions as operation inspecting monitoring means.

In Step 417, error information such as forced ON operation defect determined by Step 412a, forced OFF stop defect determined by Step 412b, time period exceeding defect determined by Step 415a, and self-reset time period exceeding defect determined by Step 415d is stored and saved in the first RAM memory 111c; and the error is announced with a display device, not shown. Step Block 450a operates when the determination of Step 415b or Step 425e is NO, or subsequently to Step 425f or Step 417, and controls various current consumers 105 responsive to the state of a variety of input sensors 107 and analog input sensors 108. However, in the process of this input/output control, the program returns to Step 410a at regular intervals to monitor whether or not the power supply switch 102 is in an open circuit.

Step 413b operates when the power supply switch 102 is determined to be in an open circuit in Step 410a, and generates a forced OFF command FOFF. In the case where the power supply switch 102 is brought in an open circuit on the way of operation inspection by means of Step 413a, the operation inspection is stopped. In Step Block 450b operative subsequently to Step 413b, an evacuation processing such as origin return operation of actuators, not shown, or saving and evacuation of learned and stored information is carried out. In the subsequent Step 420, a start operation command ST1 is generated. Step 421a operates subsequently to Step 420 and stops the generation of a self-hold drive signal DR or a watchdog clear signal WD1, and thereafter the program proceeds to an operation end step 422. Further, when a watchdog clear signal WD1 is stopped in Step 421a, the watchdog timer circuit 119 stops the output permitting signal OUTE as shown in Block 421b, the transistor is brought in non-conduction, and the output contact 104a comes to be in an open circuit.

Figure 6:
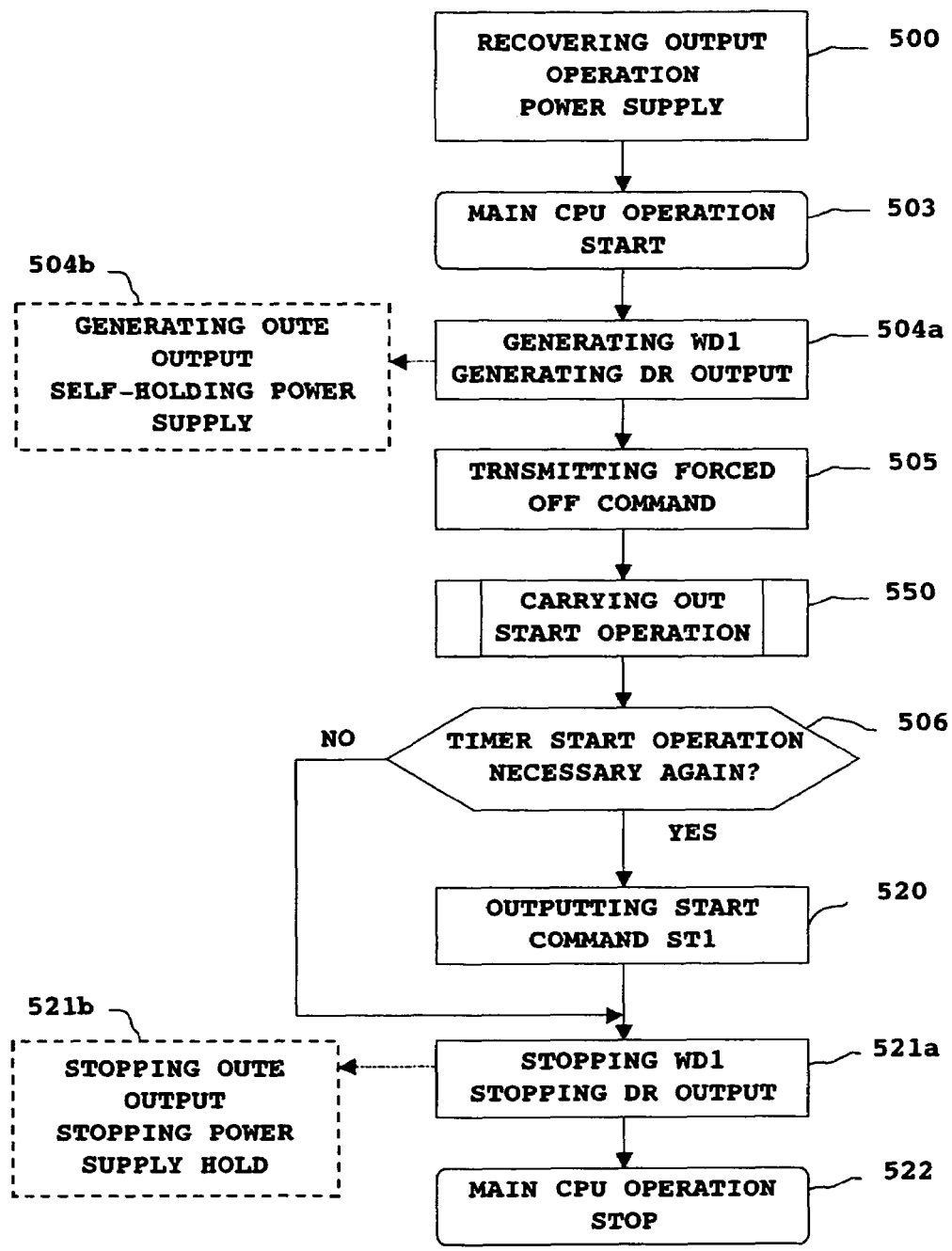
FIG. 6 is an explanatory flowchart of the second half operation subsequent to FIGS. 4 and 5.

With reference to FIG. 6, being an explanatory flowchart of the second half operation of the main CPU 111a in FIG. 1, in Step 500, accompanied by the generation of a start operation command ST1 in the mentioned Step 420, the timing counter 310 of FIG. 3 performs the counting operation of a third clock signal CLK3. In the course of time, a logic level of the first drive output PWP comes to be "H" and a logic level of the second drive output PWN comes to be "L", and an output from the logic element 127a in FIG. 1 comes to be at a logic level "H", whereby the transistor 130 comes to be conductive, the output contact 104a is brought in a closed circuit, and the power feed to the main control circuit section 110a is recovered. As a result, in Step 503, the operation of the main CPU 111a starts. In the subsequent Step 504a, a watchdog clear signal WD1 or a self-holding drive signal DR is generated. However, accompanied by the generation of a watchdog clear signal WD1, as shown in Block 504b, the watchdog timer circuit 119 generates the output permitting signal OUTE, and maintains the conduction through the transistor 130. Accordingly, the energization of the electromagnetic coil 103a is carried out even if a circuit-closing drive output is stopped.

In Step 505 operative subsequently to Step 504a, a forced OFF command FOFF is generated, and output logic processing means 313 of FIG. 3 is reset. Further, the first drive output PWP acting as a circuit-closing drive output comes to be at a logic level "L", and the second drive output PWN acting as the same comes to be at a logic level "H" to return to the drive stop state. In Step Block 550 operative subsequently to Step 505, the main CPU 111a having been started by the timer circuit section carries out a short time period of operation started by the timer according to a program that is stored in the first program memory 111b, and then the program proceeds to Step 506. In addition, the operation started by the timer carried out in Step Block 550 is, for example, an operation that detects with a pressure sensor an internal pressure of a fuel tank sealed and pressurized, and monitors a detected pressure to determine whether or not a pressure variation as time elapses is within a normal range.

In Step 506, it is determined whether or not the operation started by a timer is necessary again. In the case of requiring the re-arousal, the program proceeds to Step 520. In the case of requiring no re-arousal, the program proceeds to Step 521a. As for the determination of whether or not the re-arousal is necessary, the re-arousal becomes unnecessary, for example, on and after the determination that variation in fuel tank pressure is minute and no transpiration occurs over a sufficient elapsed time period, or on and after the time of determination that variation in fuel tank pressure is within a range of excessively large error.

In Step 520, a start operation command ST1 is generated, and thereafter the program proceeds to Step 521a. In this Step 521a, the generation of a self-hold drive signal DR or a watchdog clear signal Wd1 is stopped, and then the program proceeds to an operation end step 522.

Additionally, when the watchdog clear signal WD1 is stopped in Step 521a, as shown with Block 521b, the watchdog timer circuit 119 stops the output permitting signal OUTE, the transistor 130 is brought in non-conduction, and the output contact 104a comes to be in an open circuit.

The operations of FIGS. 4, 5, and 6 are described in brief. Step 411a acts as forced operation command means for generating the forced ON command FON. Step 412a acts as forced operation monitoring means. Step 413a acts as operation inspecting command means for generating the operation inspecting command ST2. Step Block 415 acts as operation inspection monitoring means consisting of Step 415a to Step 415f. Step 420 and Step 520 act as start operation command means for generating the start operation command ST1. Step 411b, Step 413b, and Step 505 act as forced stop command means for generating the forced OFF command FOFF.

Further, it is also preferable to wait for the self-reset operation by means of the reset timer 316 instead of generating the forced OFF command FOFF with Step 411b. In addition, it is further preferable to quit the waiting for the time period with Step 415d, generate the forced OFF command FOFF, and stop the circuit-closing output.

As explicit from the descriptions heretofore, the on-vehicle electronic control device 100a according to the first embodiment of this invention is constituted of: a main control circuit section 110a provided with a microprocessor acting as a main CPU 111a that is fed with an electric power via the switching element 104a operative in response to the operation of a power supply switch 102 and a main power supply circuit 114a from an on-vehicle battery 101, and drives various current consumers 105 in accordance with an operation state of various input sensors 107•108 and contents of a first program memory 111b; and a timer circuit section 120a that is fed with an electric power all the time via a sub power supply circuit 124 from the mentioned on-vehicle battery 101, generates an output signal WUP and connects the mentioned main power supply circuit 114a to the mentioned on-vehicle battery 101 when the mentioned time period having been measured since the generation of time period measurement start command of a microprocessor acting as the mentioned main CPU reaches a predetermined time period set by the mentioned main CPU. The mentioned timer circuit section 120a further includes: a timing counter 310 counting a clock signal that a timing clock signal generation circuit 301 generates and measuring an elapsed time period since the generation of a time period measurement start command of a microprocessor acting as the mentioned main CPU; a timer start time period setting memory 311 storing and memorizing a set time period from the mentioned main CPU; comparison determination output means 312 for generating an arousal output signal WUP when an elapsed time period corresponding to a timed current value of the mentioned timing counter 310 has reached a time period set from a main CPU that is stored in the mentioned timer start time period setting memory 311; output logic processing means 313 storing the generation of the mentioned arousal output signal WUP and generating circuit-closing drive outputs PWP•PWN for closing the circuit of the switching element 104a that is provided between the mentioned main power supply circuit 114a and on-vehicle battery 101 at the time of the mentioned storage generation; and first and second reset means for erasing a storage content of the mentioned output logic processing means 313. The mentioned first reset means is forced stop command means 505 for carrying out the reset by means of the mentioned main CPU 111a having been started by the timer circuit section; and the mentioned second reset means is self-reset means that operates when the reset by the mentioned first reset means is not carried out even if a predetermined time period has passed since the generation of the mentioned arousal output signal WUP and when the reset timer 316 that is provided in the mentioned timer circuit section 120a being operated, resets storage of the mentioned output logic processing means 313.

A circuit-closing drive output that the mentioned output logic processing means 313 generates includes first and second drive outputs PWP•PWN. The mentioned switching element 104a is driven to be in a closed circuit when the mentioned first drive output PWP is at a logic level "H" and the mentioned second drive output PWN is at a logic level "L". When the mentioned switching element 104a is brought in an open circuit, the control is carried out such that the mentioned first drive output PWP normally comes to be a logic level "H" or a logic level "X" and a second drive output PWN comes to be a logic level "H" or a logic level "X". As a result, the start by the timer circuit section is carried out only when a pair of drive outputs is both normal, thereby enabling to prevent occurrence of unnecessary arousal operation without reason due to, e.g., minor breakage of parts of the output section. Incidentally, a logic level "X" indicates a value of which logic level is neither "H" nor "L".

The mentioned main CPU 111a is provided with forced operation command means 411a urging the generation of an inspection arousal output signal with respect to the mentioned output logic processing means 313 during the period when mentioned main CPU 111a is fed with an electric power from the main power supply circuit 114a; and the mentioned main CPU 111a is provided with a monitor input terminal MNT and forced operation monitoring means 412a•412b. The mentioned monitor input terminal MNT is a terminal inputting a state of circuit-closing drive outputs PWP•PWN of the switching element 104a that the mentioned output logic processing means 313 generates to the mentioned main CPU 111a as monitoring information. The mentioned forced operation monitoring means 412a•412b are means for carrying out an operation diagnosis of the mentioned output logic processing means 313 by monitoring a simulated start output signal transmitted by the mentioned forced operation command means 411a and an operation situation of the mentioned monitor input terminal MNT in response to a reset signal transmitted by the mentioned first means. As a result, the operation inspection of the timer circuit section 120a when the power supply switch 102 is brought in a closed circuit and the on-vehicle electronic control device is operated, so that an advantage exists in that the start operation without reason due to, e.g., minor breakage of parts can be prevented.

The mentioned main CPU 111a is provided with operation inspecting command means 413a urging the mentioned timer circuit section 120a to generate an inspection signal with a predetermined simulated target time period during the mentioned main CPU 111a being fed with an electric power from the main power supply circuit 114a and being normally operated; and the mentioned main CPU 111a is provided with the mentioned monitor input terminal MNT and operation inspecting monitoring means 415. The mentioned monitor input terminal MNT is a terminal inputting to the mentioned main CPU 111a a state of circuit-closing drive outputs PWP•PWN of the switching element 104a that the mentioned output logic processing means 313 generates based on the mentioned operation inspecting command means 413a as a monitoring information. The mentioned operation inspecting monitoring means 415 is means for carrying out a start operation inspection of the mentioned timer circuit section 120a by monitoring an operation situation of the mentioned monitor input terminal MNT in response to an inspection output signal transmitted by the mentioned operation inspecting command means 413a and a reset signal transmitted by the mentioned second reset means. As a result, carrying out the operation inspection including the operation of timing a start time period leads to an advantage that the start operation without reason due to, e.g., breakage of a larger number of relevant parts can be prevented.

Furthermore, the on-vehicle electronic control device 100a according to the first embodiment is constituted of: a main control circuit section 110a provided with a microprocessor acting as a main CPU 111a that is fed with an electric power via the switching element 104a operating responsive to the operation of a power supply switch 102 and a main power supply circuit 114a from an on-vehicle battery 101 and drives various current consumers 105 in response to an operation state of various input sensors 107•108 and contents of a first program memory 111b; and a timer circuit section 120a that is fed with an electric power at all times via a sub power supply circuit 124 from the mentioned on-vehicle battery 101, measures an elapsed time period since the generation of a time period measurement start command from the mentioned main CPU, and generates an output signal WUP to connect the mentioned main power supply circuit 114a to the mentioned on-vehicle battery 101 when the mentioned measured time period has reached a predetermined time period set by the mentioned main CPU. The mentioned timer circuit section 120a includes: a timing counter 310 counting a clock signal that a timing clock signal generation circuit 301 generates and measuring an elapsed time period since the generation of a time period measurement start command of the mentioned main CPU; a timer start time period setting memory 311 storing and memorizing a set time period from the mentioned main CPU; comparison determination output means 312 for generating an output signal WUP when an elapsed time period of the mentioned timing counter 310 corresponding to a current value having been clocked has reached a set time period from a main CPU that is stored in the mentioned timer start time period setting memory 311; output logic processing means 313 for generating circuit-closing drive outputs PWP•PWN for closing the circuit of the switching element 104a that is provided between the mentioned main power supply circuit 114a and an on-vehicle battery 101 responsive to the mentioned output signal WUP; and flashing display output means 320 for driving a display element 106 to flash in a first cycle during a time period of the mentioned timing counter 310 measuring an elapsed time period from the interruption of the mentioned main power supply circuit 114a. The mentioned display element 106 is mounted at a position visible at least for a driver of a vehicle, and announces that the mentioned timer circuit section 120a is in an operable state; and the mentioned display element 106 is located at a position visible also from outside the vehicle, and functions as threatening display means for the purpose of preventing a parked vehicle from theft. As a result, a driver of the vehicle can recognize that the timer circuit section 120a is in the operable state started by the timer, and furthermore the display element 106 indicating that the timer circuit section 120a is in the operation mode serves also as a threatening display element for preventing the theft, thereby leading to an advantage that increase in power consumption can be suppressed.

The mentioned flashing display output means 320 includes continuous drive means for continuously driving the mentioned display element 106 to flash in a second cycle T2 even after a predetermined time period has elapsed since the transmission of a time period measurement start command from the mentioned main CPU, and the mentioned timer circuit section 120a has completed the generation of an output signal WUP; and the mentioned second periodic time is longer than a first periodic time, and the mentioned flashing display output means 320 identifies and announces whether the mentioned timer circuit section 120a is in an operable state or a non-operation state. As a result, an advantage exists in that it is possible to continue the threatening display while lengthening a flashing cycle to reduce power consumption even in the case of leaving an on-vehicle electronic control device for a long time period after the completion of the arousal operation.

The switching element 104a that is provided between the mentioned on-vehicle battery 101 and the main power supply circuit 114a is an output contact of a power supply rely of which electromagnetic coil 103a is driven to be in a closed circuit in response to an OR output of first, second, and third drive signals. The mentioned first drive signal is a drive signal coming to be active or reactive responsive to the turning-on or interruption of a power supply switch 102 brought in a closed circuit at the driving of a vehicle. The mentioned second drive signal is an output permitting signal OUTE coming to be active when a generation cycle of a watchdog clear signal WD1 that the mentioned main CPU 111a generates is not more than a predetermined time period, or is a self-holding drive signal DR that the mentioned main CPU 111a generates. The mentioned third drive signal is circuit-closing drive signals PWP•PWN that the mentioned timer circuit section 120a generates. Further, the mentioned circuit-closing drive outputs PWP•PWN are stopped after the mentioned main CPU 111a has been started with the mentioned third drive signal, and a closed-circuit operation of the mentioned switching element is held with the second drive signal instead of the third drive signal; otherwise the third drive signal continues to be generated, and the output thereof is stopped by the mentioned main CPU 111a accompanied by the completion of operation started by the timer. As a result, an advantage exists in that the main CPU 111a continues to be fed with an electric power with the second drive signal to be capable of carrying out a preparation operation for the start control after the interruption of the power supply switch 102. Further, it is possible for the main CPU 111a to carry out the control as to the time period of operation started by the timer accompanied by the generation of a drive output; and to interrupt the main power supply circuit 114a upon completion of the start preparing operation or the operation started by the timer eventually resulting in saving an electricity of the on-vehicle battery 101.

Embodiment 2

Figure 7:
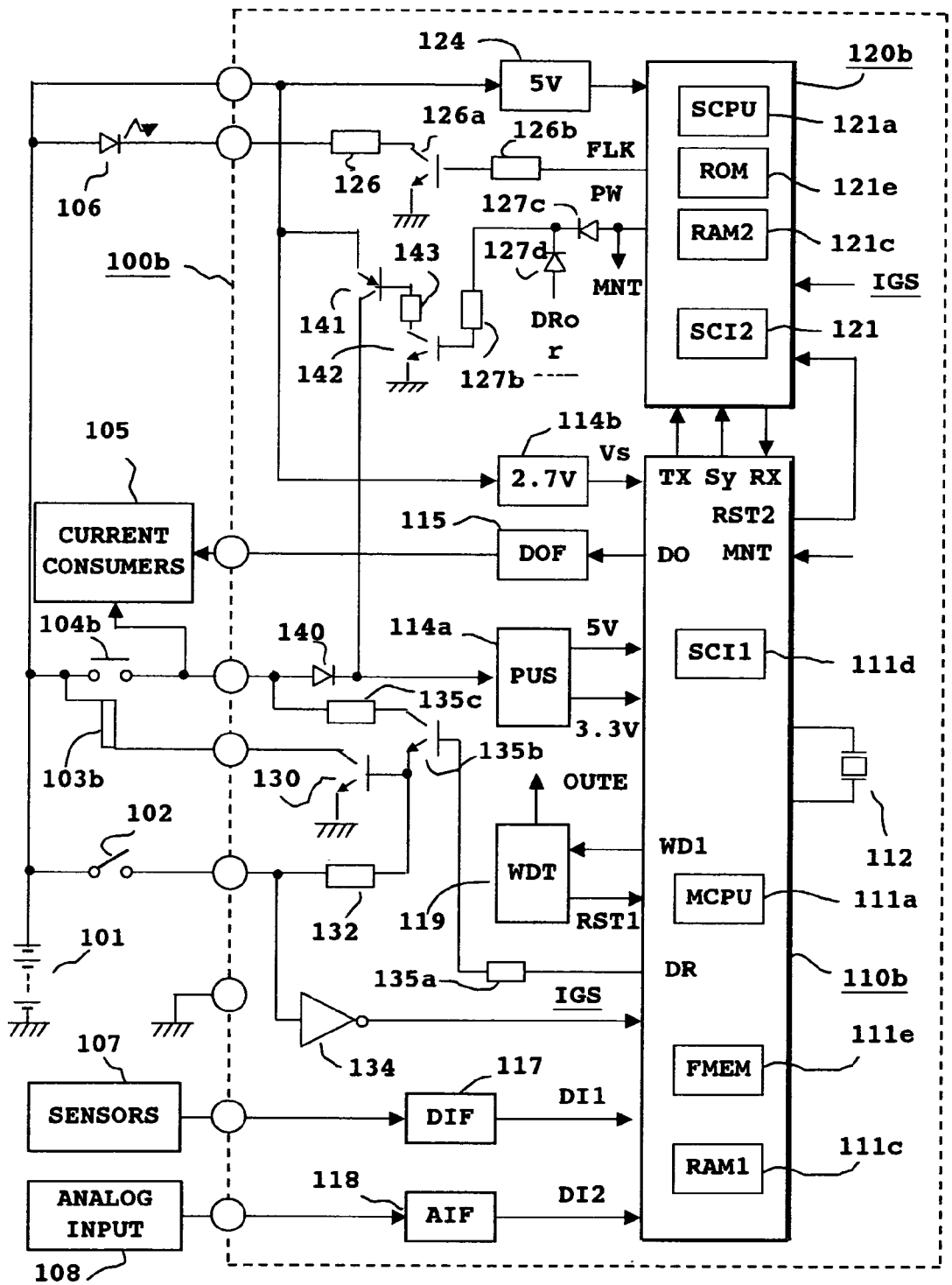
FIG. 7 is a schematic view showing the whole constitution of a second preferred embodiment of the invention.

Referring now to FIG. 7 showing an entire schematic view of a second preferred embodiment of this invention, points different from those of FIG. 1 are mainly described. With reference to FIG. 7, an on-vehicle electronic control device 100b is constituted of a main control circuit section 110b and a timer circuit section 120b as main components. First, an output contact 104b of a power supply relay including an electromagnetic coil 103b is connected to a main power supply circuit 114a via a reverse-current inhibiting diode 140 to form a first power feed circuit from an on-vehicle battery 101. The main control circuit section 110b includes a first program memory 111e such as non-volatile flash memory, a RAM memory 111c for the operation processing, and a serial-parallel converter 111d in cooperation with a main CPU 111a, and generates a self-holding drive signal DR accompanied by the start of operation of the main CPU 111a. A transistor 130 for energizing an electromagnetic coil 103b is driven in conduction via a drive resistor 132 in response to the fact that a power supply switch 102 is in a closed circuit. Further, a transistor 135b that is driven in conduction via a base resistor 135a from a self-holding drive signal DR during the operation of the main CPU 111a, and the transistor 130 is held in conduction by a drive resistor 135c and the transistor 135b.

Figure 8:
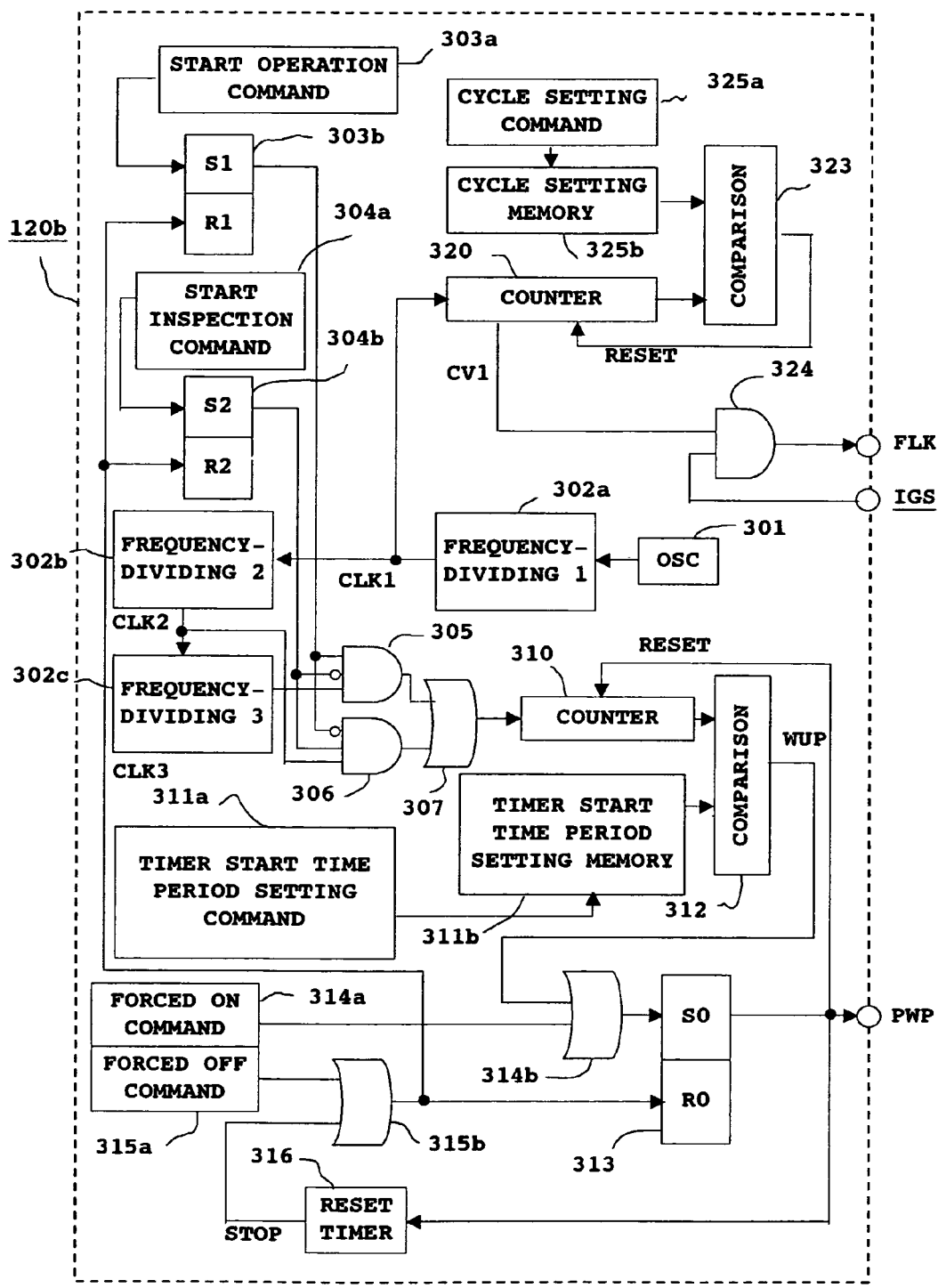
FIG. 8 is an equivalent control block diagram of a timer circuit section of FIG. 7.

The timer circuit section 120b includes, as described in detail referring to FIGS. 7 and 8, a sub CPU 121a operating at a low speed and with a low power consumption, a second program memory 121e such as mask ROM memory, a second RAM memory 121c, and serial-parallel converter 121d. After a predetermined time period set by the main CPU has passed since the occurrence of an open circuit of the above-mentioned output contact 104b acting as a first switching element, this timer circuit section 120b generates a circuit-closing drive output PWP.

During from the generation of start command to the generation of a start output signal, a flashing display output FLK performs an ON/OFF operation. Further, the main CPU 111a and the sub CPU 121a are arranged so as to be capable of carrying out a serial communication with each other via a pair of serial-parallel converters 111d and 121d. However, an inverting logic signal IGS for detecting the operation of the power supply switch 102 is directly input to the sub CPU 121a as well. In addition, a circuit-closing drive output PWP is also directly input to a monitor input terminal MNT of the main CPU 111a; and furthermore the main CPU 111a is arranged to generate the later-described reset pulse signal RST2 to be capable of initializing and restarting the sub CPU 121a.

A transistor 141 acting as a second switching element is connected between the on-vehicle battery 101 and the main power supply circuit 114a. This transistor 141 is driven in conduction via a drive resistor 143 when a transistor 142 that is provided in a base circuit is conductive.

The above-mentioned transistor 142 is driven in conduction via a series circuit of a diode 127c and a drive resistor 127b from the circuit closing drive output PWP. Furthermore, the above-mentioned transistor 142 is held in conduction via a series circuit of a diode 127d and a drive resistor r127b from the self-holding drive output DR.

Additionally, instead of the self-holding drive output DR functioning to hold the transistor 135b and the transistor 142 in conduction, an output permitting signal OUTE that the watchdog timer circuit 119 generates when a pulse width of a watchdog clear signal WD1, being a pulse train that the main CPU 111a generates is not more than a predetermined value, can be used as well. Furthermore, on the supposition that the sub CPU 121a continues to generate an arousal output signal PWP and the generation of this output signal is stopped by the main CPU 111a accompanied by the end of operation started by the timer, it is unnecessary to drive the transistor 142 with the self-holding drive signal DR or the output permitting signal OUTE.

FIG. 8 shows an equivalent control block diagram of control contents that the sub CPU 121a in FIG. 7 executes in cooperation with the second program memory 121e. With reference to FIG. 8, a clock signal that a timing clock signal generation circuit 301 generates is frequency-divided by a first dividing circuit means 302a to generate a first clock signal CLK1 having aperiodic time of, e.g., 0.1 second, is further frequency-divided in a second dividing means 302b to generate a second clock signal CLK2 having a periodic time of, e.g., 1 second, and is further frequency-divided in a third dividing means 302c to generate a third clock signal CLK3 having a periodic time of, e.g., 1 minute.

Start command storage means 303b is constituted of, for example, a flip-flop including a set input S1 and a reset input R1, and stores the receiving of a start operation command 303a having been transmitted from the main CPU 111a. Operation inspecting command storage means 304b is constituted of, for example, a flip-flop including a set input S2 and a reset input R2, and stores the receiving of an operation inspecting command 304a having been transmitted form the main CPU111a.

An AND element 305 generates an AND output of logic inverting outputs of a storage output from the start command storage means 303b and a storage output from the operation inspecting command storage means 304b, and a third clock signal CLK3. Further, an AND element 306 generates an AND output of logic inverting outputs of a storage output from the operation inspecting command storage means 304b and a storage output from the start command storage means 303b, and a second clock signal CLK2. Outputs from the AND elements 305 and 306 are connected to an input of an OR element 307.

A timing counter 310 is arranged so as to count an output signal from the OR element 307. This timing counter 310 performs the counting at a low speed with a third clock signal CLK3 during a storage output from the start command storage means 303b being generated; and performs the counting at a high speed with a second clock signal CLK2 during a storage output from the operation inspecting command storage means 304b being generated. A constant corresponding to a value obtained by dividing a set time period from the main CPU accompanied with a timer start time setting command 311a having been transmitted from the main CPU 111a by a periodic time of a third clock signal CLK3 is transferred and stored in a timer start time period setting memory 311b. In addition, a target value having been converted in accordance with a timing unit of the timing counter 310 is transmitted from the main CPU 111a, or this conversion processing is carried out on the side of the sub CPU 111a.

Comparison determination output means 312 compares a current value of the timing counter 310 with a constant that is stored in the timer start time period setting memory 311b, and generates an arousal output signal WUP when both of them are in coincidence. Output logic processing means 313 is constituted of, for example, a flip-flop including a set input SO and a reset input RO, and a set output thereof is a circuit-closing drive output PWP.

An OR element 314b resets output logic processing means 313 with an OR output of a stop signal STOP that the comparison determination output means 312 generates and a forced ON command 314a having been transmitted from the main CPU 111a; and a current value of the timing counter 310 is reset to 0 by the set output of the output logic processing means 313.

An OR element 315b resets output logic processing means 313 with an OR output of a stop signal STOP that the later-described reset timer 316 generates and a forced OFF command 315a having been transmitted from the main CPU 111a; and resets the start command storage means 303b and the operation inspecting command storage means 304b.

A reset timer 316 starts the timing accompanied by the generation of a set output from the output logic processing means 313, and generates a stop signal STOP after a predetermined limit time period has passed to reset the output logic processing means 313, the start command storage means 303b, and the operation inspecting command storage means 304b.

Flashing display output means 320 is constituted of a counter counting a generated pulse of a first clock signal CLK1. A flashing periodic time accompanied with a periodic time setting command 325a having been transmitted from the main CPU 111a is stored in a cycle setting memory 325b. Comparison means 323 compares a current value of the counter acting as flashing display output means 320 with a content in the cycle setting memory 325b, and resets a current value of the counter acting as flashing display output means 320 to 0 whenever they are in coincidence as a result of comparison.

A gate element 324 is constituted of an AND element of which inputs are a current value output CV1 that is at a logic level "H" when a current value of the counter acting as flashing display output means 320 is 1, and an inverting logic signal IGS1 that is at a logic level "L" when the power supply switch 102 is brought in a closed circuit. An AND output thereof is a flashing display output FLK.

In addition, a periodic time of a first clock signal CLK1 is, for example, 0.1 second; while a flashing periodic time to be stored in the cycle setting memory 325b is variably set to a value of 20 to 30 corresponding to, for example, 2 to 3 seconds.

Nevertheless, when the power supply switch 102 is in a closed circuit, a flashing display output FLK is stopped by the action of a gate element 324 to be fixed at a logic level "L".

Further, FIG. 8 shows an equivalent control block with regard to an operation content of the sub CPU 121a in cooperation with a second program memory 121e. With respect to start command storage means 303b, operation inspecting command storage means 304b, timer start time period setting memory 311b, and cycle setting memory 325b, a second RAM memory 121c is used, and a variety of logic processing is carried out according to a control program that is stored in a second program memory 121e.

However, a timing clock signal generation circuit 301 employs a ring counter formed by connecting, for example, an odd number of logic inverting elements in an annularly slaved manner. This ring counter exhibits a poor accuracy of cycle as compared with a reference oscillator 112 used in the main CPU 111a. Further, a gate element 324 or output logic processing means 313 is also constituted of hardware provided outside the sub CPU 121a.

Figure 9:
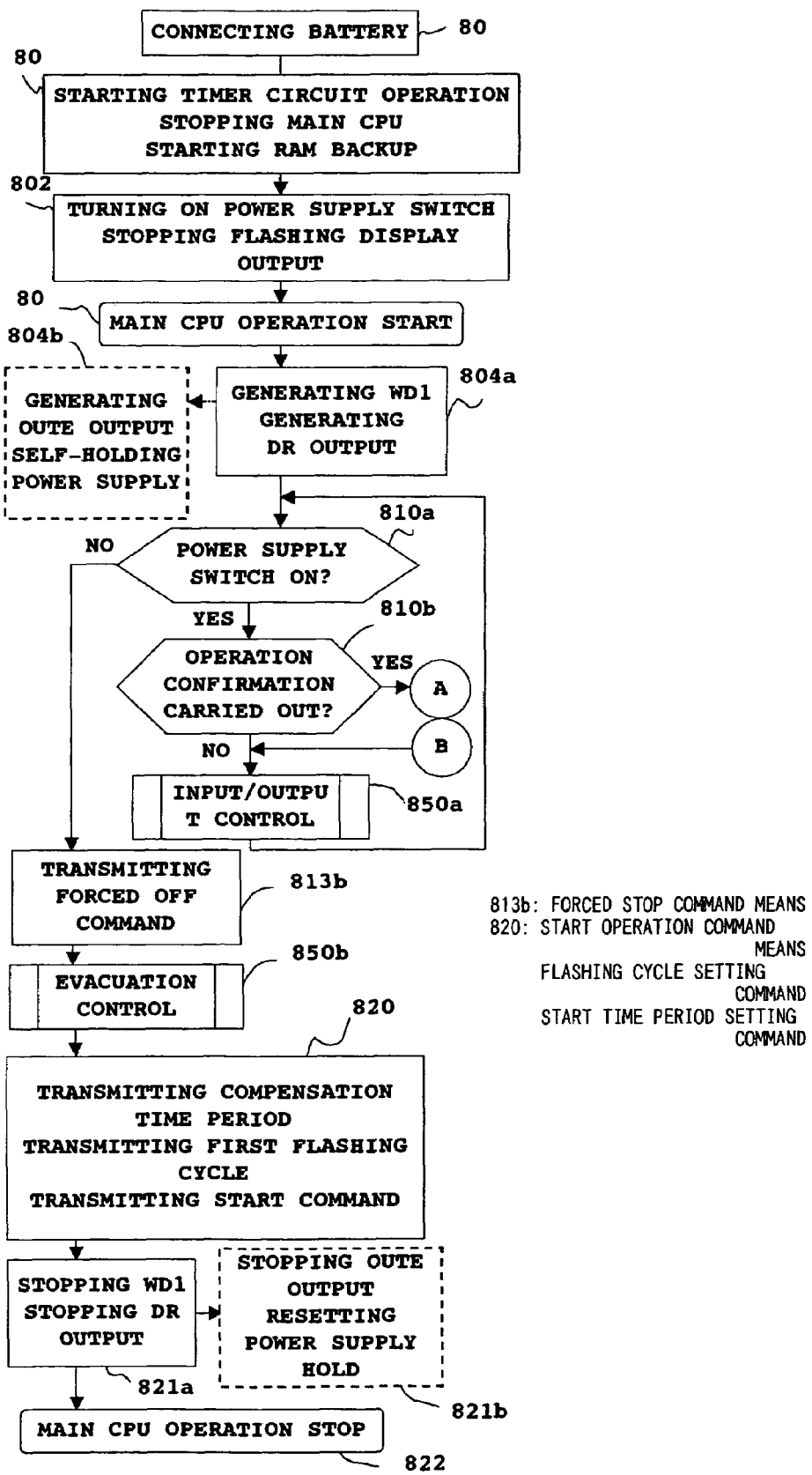
FIG. 9 is an explanatory flowchart of the first half operation of FIG. 7.
Figure 10:
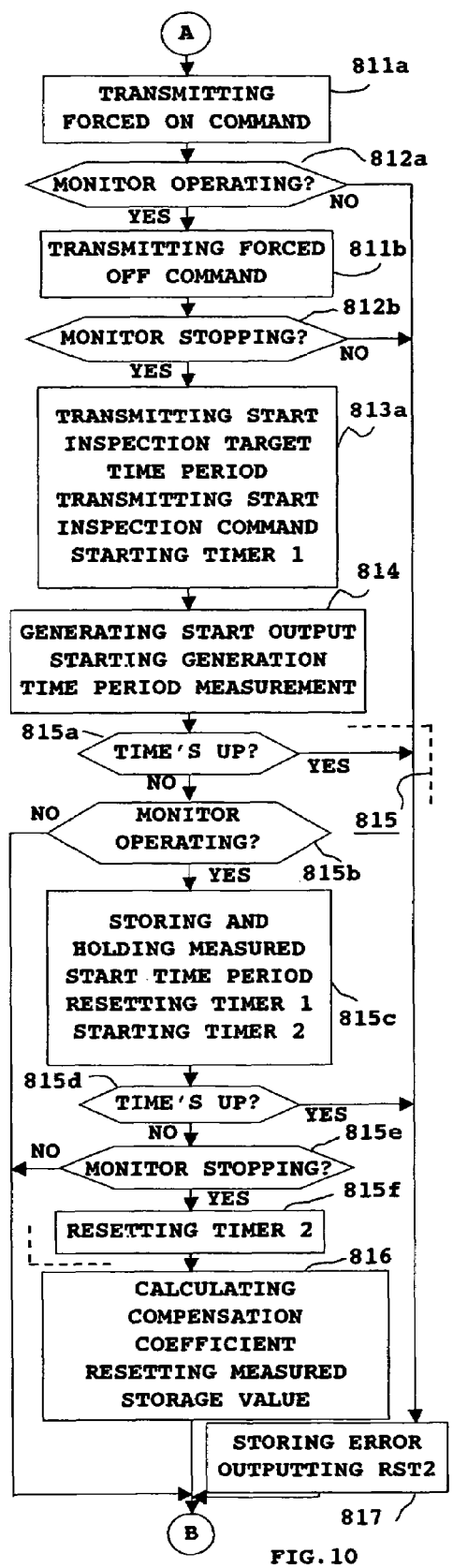
FIG. 10 is an explanatory flowchart of the first half operation of FIG. 7.

With reference to FIGS. 9 and 10, being an explanatory flowchart of the first half operation of the main CPU 111a of FIG. 7, when the on-vehicle electronic control device 100b is connected to the on-vehicle battery 101 in Step 800, in the subsequent Step 801, the timer circuit section 120b is fed with an electric power from a sub-power supply circuit 124 to be in the state capable of operation; and the main control circuit section 110b becomes in the state capable of holding the storage of the first RAM memory 111c by means of a sleep power supply circuit 114b. However, the main CPU is still in the stop state.

Then, when the power supply switch 102 is turned on in Step 802, a flashing display output FLK is normally stopped by the action of the gate element 324 of FIG. 8. However, the transistor 130 of FIG. 7 is brought in conduction, an electromagnetic coil 103b is energized, an output contact 104b is brought in a closed circuit, and the power feed to the main control circuit section 110a is started. In the subsequent Step 803, the main CPU 111a starts the operation.

Step 804a operates subsequently to Step 803, and generates a watchdog clear signal WD1 or a self-holding drive signal DR. Accompanied by the generation of a watchdog clear signal WD1, as shown with Block 804, the watchdog timer circuit 119 generates an output-permitting signal OUTE. The conduction through the transistor 130 is maintained accompanied by the generation of a self-hold drive signal DR. Accordingly, the energization of the electromagnetic coil 103b is kept even if the power supply switch 102 is in an open circuit.

In Step 810a operative subsequently to Step 804a, it is determined whether or not the power supply switch 102 continues to be in a closed circuit by monitoring an inverting logic signal IGS. In the case where the power supply switch 102 is in a closed circuit, the program proceeds to Step 810b. In the case where the power supply switch 102 is in open circuit, the program proceeds to Step 813b.

In Step 810b, it is determined whether or not an operation confirmation test of the timer circuit section 120b is carried out. When the operation confirmation test is carried out, the program proceeds to Step 811a. When the operation confirmation test is not carried out, the program proceeds to Step Block 850a. In addition, the determination in Step 810b is made substantially at regular intervals during a period when an engine speed is low and the main CPU 111ab has a margin of response supposing that the on-vehicle electronic control device 100a is, for example, an engine control device.

In Step 811a, a forced ON command 314a, shown in FIG. 8, is transmitted. In the subsequent Step 812a, it is determined whether or not a circuit-closing drive output PWP is normally operated by monitoring a monitor input terminal MNT. In the case of operation error, the program proceeds to Step 817. In the case of normal operation, the program proceeds to Step 811b.

In Step 811b, a forced OFF command 315a, shown in FIG. 8, is transmitted. In the subsequent Step 812b, it is determined whether or not the operation of a circuit-closing drive output PWP is normally stopped by monitoring a monitor input terminal MNT. In the case of stop error, the program proceeds to Step 817. In the case of normal stop, the program proceeds to Step 813a.

In Step 813a, an arousal target time setting command 311a and an operation inspecting command 304a for the practice are transmitted as shown with FIG. 8; and a timer 1 that is Time's UP in a time period rather longer than an operation inspecting time period is started. In the subsequent Step 815a, it is determined whether or not the timer 1 is Time's Up. In the case where the timer 1 is Time's Up, the program proceeds to Step 817. In the case where the timer 1 is not Time's Up, the program proceeds to Step 815b.

In Step 815b, a monitor input terminal MNT is monitored, thereby determining whether or not a circuit-closing drive output PWP has been generated. In the case where this circuit-closing drive output PWP has not been generated yet, the program goes through Step block 850a and recirculates to return to Step 815a. In the case where a circuit-closing drive output PWP has been generated, the program proceeds to Step 815c. Additionally, accompanied by the generation of an operation inspecting command 304a by Step 813a, the timing counter 310 shown in FIG. 8 counts the number of second clock signals CLK2, thereby operating at a high speed and reaching a time period set by the main CPU to generate an output signal WUP.

In Step 815c, a measured value of a time period of which measurement having been started in Step 814 is held and stored; and the timer 1 having been started in Step 813a is reset, and a timer 2 that is Time's Up in a time period corresponding to rather longer than a set time period of the reset timer 316 of FIG. 8 is started.

In Step 815d, it is determined whether or not the timer 2 is Time's Up. In the case of Time's Up, the program proceeds to Step 817. In the case of not being Time's Up, the program proceeds to Step 815e. In Step 815e, a monitor input terminal MNT is monitored, thereby determining whether or not a circuit-closing drive output PWP is stopped. In the case where this circuit-closing drive output PWP is not stopped, the program goes through Step Block 850a and recirculates to return to Step 815d. In the case where a circuit-closing drive output PWP is stopped, the program proceeds to Step 815f.

In Step 815f, the timer 2 having been started in Step 815c is reset, and then the program proceeds to Step 816. In Step 816, a compensation coefficient $K=\tau2/\tau1$, being a ratio between an operation inspecting target time period $\tau2$ having been transmitted in Step 183e to an actual operation inspecting time period $\tau1$ having been measured and stored in Step 815c is calculated, and thereafter resets an actually-measured time period having been stored and held in Step 815c. Subsequently, the program proceeds to Step Block 850a.

Additionally, Step Block 815 consisting of Step 815a to Step 815f functions as operation inspecting monitoring means.

In Step 817, error information such as forced ON operation defect determined by Step 812a, forced OFF stop defect determined by Step 812b, practice arousal time period exceeding defect determined by Step 815a, and self-reset time period exceeding defect determined by Step 815d are stored and saved in the first RAM memory 111c, and a reset pulse signal RST2 is generated to initialize and restart the sub CPU 121a. In addition, the error is announced with a display device, not shown.

Step Block 850a operates when the determination in Step 815b or Step 825e is NO, or subsequently to Step 816 or Step 817, and controls various current consumers 105 responsive to the states of a variety of input sensors 107 and analog input sensors 108. However, in the process of this input/output control, the program returns to Step 810a at regular intervals to monitor whether or not the power supply switch 102 is in an open circuit.

Step 813b operates when the power supply switch 102 is determined to be in an open circuit in Step 810a, and generates a forced OFF command 315a shown in FIG. 8. In the case where the power supply switch 102 is brought in an open circuit on the way of inspection operation by Step 813a, the operation inspection is stopped.

In Step Block 850b operative subsequently to Step 813b, an evacuation processing such as origin return operation of actuators, not shown, or saving and evacuation of learned and stored information is carried out. In the subsequent Step 820, a set time period from a compensation main CPU obtained by multiplying a time period set from the main CPU by a compensation coefficient having been calculated in Step 816 is transmitted, and a first periodic time T1 is transmitted as a flashing cycle of a flashing display output FLK, and further a start operation command is generated.

In addition, a set data with respect to a timer start time period setting memory 311b or a cycle setting memory 325b of FIG. 8 is transmitted and stored in response to the operation of Step 820, and the start operation is started with a start operation command 303a.

Step 821a operates subsequently to Step 820 and stops the generation of a self-hold drive signal DR or a watchdog clear signal WD1. Thereafter, the program proceeds to an operation end step 822.

Further, when the self-hold drive signal DR is stopped in Step 821a, the transistor 130 is brought in non-conduction, and an output contact 104b comes to be in an open circuit. Moreover, when the watchdog clear signal WD1 is stopped in Step 821a, a watchdog timer circuit 119 stops an output permitting signal OUTE as shown with Block 821b.

Figure 11:
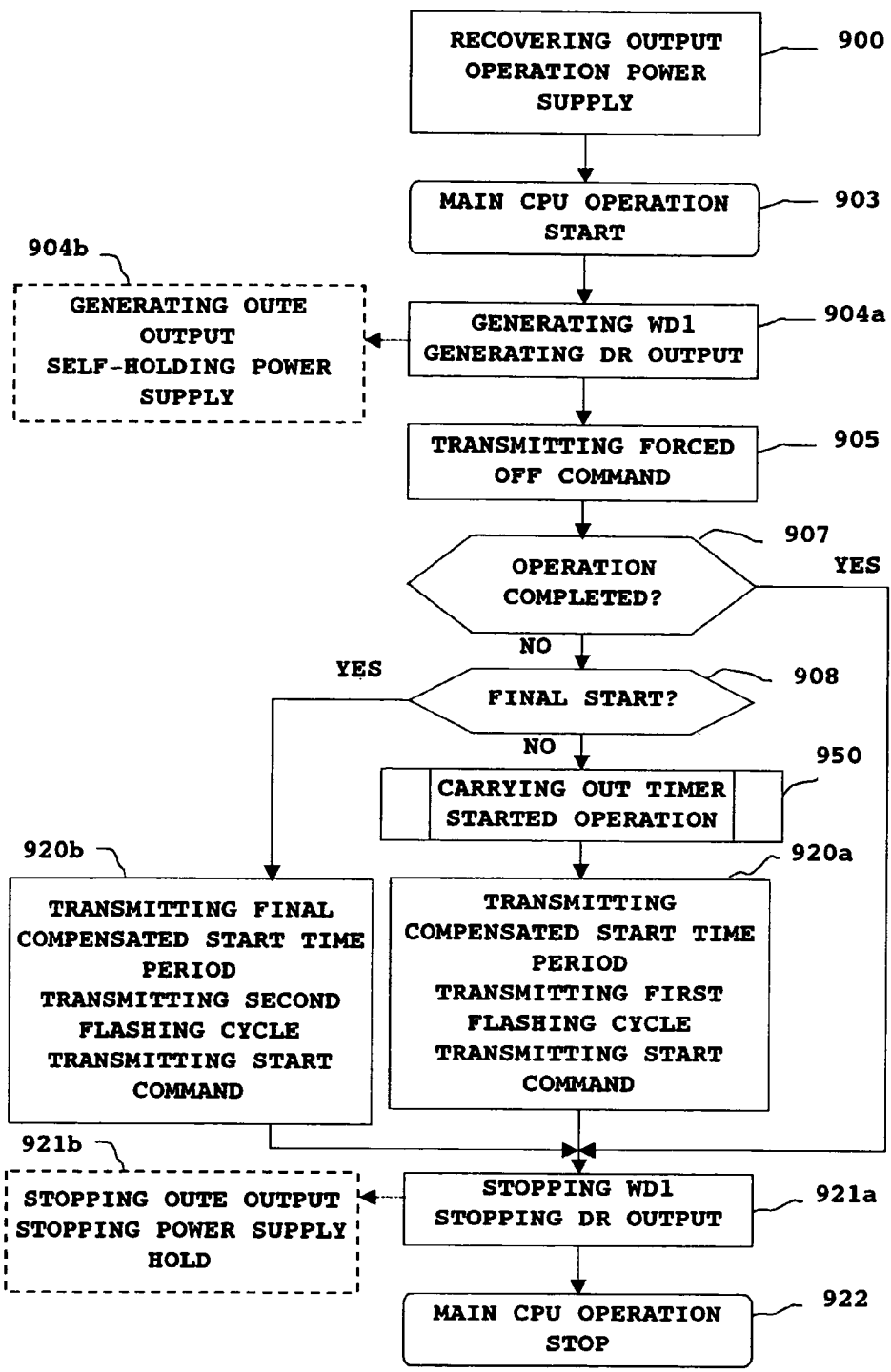
FIG. 11 is an explanatory flowchart of the second half operation subsequent to FIGS. 9 and 10.

With reference to FIG. 11, being an explanatory flowchart of the second half operation of the main CPU 111a in FIG. 7, in Step 900, accompanied by the transmission of a start operation command 303a in the mentioned Step 820, the timing counter 310 of FIG. 8 performs the counting operation of a third clock signal CLK3. In the course of time, a logic level of a circuit-closing drive output PWP comes to be "H", the transistor 142 in FIG. 7 becomes conductive, the second switching element 141 is brought in a closed circuit, and the power feed to the main control circuit section 110b is recovered.

As a result, in Step 903, the operation of the main CPU 111a starts. In the subsequent Step 904a, the watchdog clear signal WD1 or the self-holding drive signal DR is generated. However, accompanied by the generation of a watchdog clear signal WD1, as shown in Block 904b, the watchdog timer circuit 119 generates an output- permitting signal OUTE. Accompanied by the generation of a self-hold drive signal in Step 904b, the conduction through the transistor 142 is maintained. Accordingly, the second switching element 141 continues to be in a closed circuit even if the generation of the circuit-closing drive output PWP is stopped.

In Step 905 operative subsequently to Step 904a, a forced OFF command 315a, shown in FIG. 8, is transmitted, output logic processing means 313 of FIG. 8 is reset, and a circuit-closing output PWP is stopped.

In Step 907 operative subsequently to Step 904a, it is determined whether or not the restart is necessary. In the case where the start has completed, the program proceeds to Step 921a. In the case where the restart is necessary, the program proceeds to Step 908.

In Step 908, it is determined whether or not this time start is a final start. In the case of the final start, the program proceeds to Step 920b. In the case of not being the final start, the program proceeds to Step Block 950.

In Step Block 950, the main CPU 111a having been started by the timer circuit section executes a predetermined operation started by the timer according to a program that is stored in the first program memory 111e, and thereafter the program proceeds to Step 920a.

In addition, the operation started by the timer carried out in Step Block 950 is, for example, an operation that detects with a pressure sensor an internal pressure of a fuel tank sealed and pressurized, and monitors a detected pressure to determine whether or not a pressure variation as time elapses is within a normal range.

As for the determination of whether or not the re-arousal is necessary, the re-arousal becomes unnecessary, for example, on and after the time of determination that variation in fuel tank pressure is minute and no transpiration occurs over a sufficient elapsed time period, or on and after the time of determination that variation in fuel tank pressure is within a range of excessively large error.

In the case where any determination result is obtained, a final start flag, now shown, is set. In the next operation started by the timer, Step 980 makes the determination of the final start, and then the program proceeds to Step 920b.

In Step 920a, as in the case with Step 820, a set time period obtained by multiplying a time period set from the main CPU by a compensation coefficient having been calculated in Step 816 is transmitted, and a second periodic time T1 is transmitted as a flashing cycle of a flashing display output FLK, and further a start operation command 303a is transmitted. Thereafter, the program proceeds to Step 921a.

In Step 920b, as in the case with Step 820, a set time period obtained by multiplying a time period set from the main CPU by a compensation coefficient having been calculated in Step 816 is transmitted, and a second periodic time T2 is transmitted as a flashing cycle of a flashing display output FLK, In Step 920b, a compensated final set time period obtained by multiplying a set time period from the main CPU by a compensation coefficient having been calculated in Step 816 is transmitted, and a second periodic time T2 is transmitted as a flashing cycle of a flashing display output FLK, and further a start operation command 303a is transmitted. Thereafter, the program proceeds to Step 921a.

In Step 920*a*, for example, an hour of start target time period is set, and the operation started by the timer is carried out, e.g., five times at intervals of 1 hour to complete. In Step 920*b*, for example, a time period corresponding to 1 week is set, and this time period is a final timer start time period. In this case, the display element 106 flashes in a cycle of 2 seconds during the first 5 hours, flashes in a cycle of 3 seconds in the last 1 week, and thereafter stops the lighting.

In Step 921*a*, the generation of the self-hold drive signal DR or the watchdog clear signal WD1 is stopped, and then the program proceeds to an operation end step 922. Additionally, when a self-old drive signal DR is stopped in Step 921*a*, the transistor 142 is brought in non-conduction, and the second switching element 141 comes to be in an open circuit.

Furthermore, when the generation of the watchdog clear signal WD1 is stopped in Step 921*a*, the watchdog timer circuit 119 stops the output permitting signal OUTE as shown with Block 921*b*.

The operations of FIGS. 9, 10, 11 are described in brief. Step 811*a* is forced operation command means for transmitting a forced ON command 314*a*. Step 811*b*, Step 813*b* and Step 905 are forced stop command means for transmitting a forced OFF command 315*a*. Step 812*a* and Step 812*b* are forced operation-monitoring means. Step 813*a* is operation inspecting command means for transmitting a timer start time setting command 311*a* and an operation inspecting command 304*a*. Step 814 is measurement means for measuring a practice arousal time period. Step Block 815 is operation inspecting monitoring means consisting of Step 815*a* to Step 815*f*. Step 816 is compensation means for calculating a compensation coefficient. Step 820 and Step 920*a* are start operation command means for transmitting a set time period setting command 311*a*, a first flashing periodic time setting command 325*a*, and a start operation command 303*a* from the compensation main CPU. Step 980 is set value changing means of a flashing cycle. Step 920*b* is start operation command means for transmitting a final compensation set time period setting means 311*a*, a second flashing cycle setting command 325*a*, and a start operation command 303*a*.

In addition, it is possible that the transmission of the forced OFF command of Step 905 is moved to immediately before Step 921*a* at point of time when the operation of Step 920*a* or Step 920*b* has completed. In this case, a set time period of the reset timer in FIG. 8 is set to a time period rather longer than the time period necessary for the operation started by the timer. Further, the diode 127 in FIG. 7 is unnecessary, and it is not necessary to maintain the conduction through the transistor 142 with the self-hold drive signal DR or the output-permitting signal OUTE.

Further, it is also preferable to wait for a self-reset operation by means of the reset timer 316 instead of transmitting a forced OFF command by means of Step 811*b*. It is also preferable to quit the waiting for a time period by means of Step 815*d*, to transmit the forced OFF command, and to stop a circuit closing drive output.

As explicit from the descriptions heretofore, the on-vehicle electronic control device 100*b* according to the second embodiment of this invention is constituted of: a main control circuit section 10*b* provided with a microprocessor acting as a main CPU 111*a* that is fed with an electric power via a switching element 104*b* operating responsive to the operation of a power supply switch 102 and a main power supply circuit 114*a* from an on-vehicle battery 101, and drives various current consumers 105 in accordance with an operation state of various input sensors 107•108 and contents of a first program memory 111*e*; and a timer circuit section 120*b* that is fed with an electric power all the time via a sub power supply circuit 124 from the mentioned on-vehicle battery 101, measures a time period from the generation of a time period measurement start command by the mentioned main CPU 111*a*, and generates an arousal output signal WUP and connects the mentioned main power supply circuit 114*a* to the mentioned on-vehicle battery 101 when the mentioned measured time period has reached a set time period from the mentioned main CPU 111*a*.

The mentioned timer circuit section 120*a* further includes: a timing counter 310 counting a clock signal that a timing clock signal generation circuit 301 generates, and measuring an elapsed time period from the interruption of a main power supply circuit 114*a*; a timer start time period setting memory 311 storing and memorizing a set time period from the mentioned main CPU; comparison determination output means 312 for generating an arousal output signal WUP when an elapsed time period corresponding to a current value having been timed of the mentioned timing counter 310 has reached a set time period from a main CPU that is stored in the mentioned timer start time period setting memory 311; output logic processing means 313 storing the generation of the mentioned arousal output signal WUP, and generating a circuit-closing drive output PWP for closing the circuit of a switching element 141 that is provide between the mentioned main power supply circuit 114*a* and on-vehicle battery 101 at the time of the mentioned storage generation; and first and second reset means for erasing a storage content of the mentioned output logic processing means 313.

The mentioned first reset means is forced stop command means 905 for carrying out the reset by means of the mentioned main CPU 111*a* having been started by the timer circuit section. The mentioned second reset means is self-reset means that operates when the reset by the mentioned first reset means 905 is not carried out even if a predetermined time period has passed since the generation of the mentioned arousal output signal WUP, and a reset timer 316 that is provided in the mentioned timer circuit section 120*b* being operated, resets storage of the mentioned output logic processing means 313.

The mentioned main CPU 111*a* is provided with forced operation command means 811*a* promoting the generation of an inspection output signal relative to the mentioned output logic processing means 313 during the mentioned main CPU 111*a* being fed with an electric power from a main power supply circuit 114*a* and being normally operated; and the mentioned main CPU 111*a* is provided with a monitor input terminal MNT and forced operation monitoring means 812*a* • 812*b*.

The mentioned monitor input terminal MNT is a terminal inputting to the mentioned main CPU 111*a* a state of circuit-closing drive outputs PWP•PWN of a switching element that the mentioned output logic processing means 313 generates as monitoring information. The mentioned forced operation monitoring means for carrying out an operation inspection of the mentioned output logic processing means 313 by monitoring an operation situation of the mentioned monitor input terminal MNT in response to a simulated operation output signal transmitted by the mentioned forced operation command means 811*a* and a reset signal transmitted by the mentioned first reset means.

As a result, the operation inspection by means of the timer circuit section 120*a* is carried out when the power supply switch 102 is brought in a closed circuit, and the on-vehicle electronic control device 100b is operated and used, so that operation without reason due to, e.g., any breakage of parts can be prevented.

The mentioned main CPU 111a is provided with operation inspecting command means 813a urging the mentioned timer circuit section 120b to generate an inspection output signal with a predetermined simulated target time period during the mentioned main CPU 111a being fed with an electric power from a main power supply circuit 114a and being normally operated; and the mentioned main CPU 111a is provided with the mentioned monitor input terminal MNT and operation inspecting monitoring means 815.

The mentioned monitor input terminal MNT is a terminal inputting to the mentioned main CPU 111a a state of a circuit-closing drive output PWP of a switching element 104a that the mentioned output logic processing means 313 generates based on the mentioned operation inspecting command means 813a as monitoring information. The mentioned operation inspecting monitoring means 815 is means for carrying out a start operation inspection of the mentioned timer circuit section 120b by monitoring an operation situation of the mentioned monitor input terminal MNT in response to an inspection output signal transmitted by the mentioned operation inspecting command means 813a and a reset signal transmitted by the mentioned second reset means. As a result, the operation inspection including the operation of timing a start time period is carried out, thereby enabling to prevent the unnecessary operation due to, e.g., any breakage of a more number of relevant parts.

The mentioned timer circuit section 120b and the mentioned main control circuit section 110b are arranged so as to communicate with each other through serial communication circuits 111d • 121d; at least a set time period from the main CPU that is stored in the mentioned timer start time period setting memory 311b is transmitted from the mentioned main CPU 111a via the mentioned serial communication circuits 111d • 121d; and the mentioned main CPU 111a is provided with measurement means 814 of a simulated start time period and compensation coefficient operation means 816 with respect to a simulated target time period.

The mentioned measurement means 814 is means for measuring at a main CPU 111a an elapsed time period τ1 from the generation of an operation inspection command 304a being generated by a main CPU 111a to the generation of a circuit-closing drive output PWP being generated by the mentioned timer circuit section 120b. The mentioned compensation coefficient operation means 816 is means for calculating a ratio K=τ2/τ1 between a practice target time period τ2 having been applied at the timer circuit section 120b in the mentioned operation inspection and an elapsed time period τ1 having been measured by the mentioned measurement means. A compensation set time period T to be transmitted to the mentioned timer circuit section 120b is compensated by T=TO×K with respect to a set time period TO from the main CPU to be actually required.

As a result, even if a timing clock signal generation circuit 301 exhibits a poor cycle accuracy, particularly in irregularity or variation in individual products, an automatic compensation is carried out so that a compensation coefficient with respect to individual products is calculated, and a required arousal time period is obtained by means of the main CPU 111a operative in synchronization with a highly accurate reference oscillator 112.

The mentioned timer circuit section 120b further includes a microprocessor acting as a sub CPU 121a operative in cooperation with a second program memory 121e; and the mentioned sub CPU 121a and the mentioned main CPU 111a are arranged to communicate with each other through serial communication circuits 111d • 121d. At least set time period from the main CPU that is stored in the mentioned timer start time period setting memory 311b is transmitted via the mentioned serial communication circuits 111d • 121d from the mentioned main CPU 111a; while a monitor input monitoring a circuit-closing drive output PWP that the mentioned output logic processing mans 313 generates is that input to the main CPU 111a via a monitor input terminal MNT non-dependent on the mentioned serial communication circuits 111d • 121d.

As a result, the operation inspection of the timer circuit section 120b and the serial communication circuits 111d • 121d is carried out when the power supply switch 102 is in a closed circuit, and the on-vehicle electronic control device 100b is operated and used leading to an advantage that the unnecessary operation due to, e.g., any breakage of parts can be prevented.

An on-vehicle electronic control device 100b according to the second embodiment of this invention is constituted of: a main control circuit section 110b provided with a microprocessor acting as a main CPU 111a that is fed with an electric power via a switching element 104b operating responsive to the operation of a power supply switch 102 and a main power supply circuit 114a from an on-vehicle battery 101, and drives various current consumers 105 in accordance with an operation state of various input sensors 107 • 108 and contents of a first program memory 111e; and a timer circuit section 120b that is fed with an electric power all the time via a sub power supply circuit 124 from the mentioned on-vehicle battery 101, measures a time period from the generation of a time period measurement start command by the mentioned main CPU 111a, and generates an arousal output signal WUP and connects the mentioned main power supply circuit 114a to the mentioned on-vehicle battery 101 when the mentioned measured time period has reached a set time period from the main CPU.

The mentioned timer circuit section 120b includes: a timing counter 310 counting a clock signal that a timing clock signal generation circuit 301 generates and measuring an elapsed time period since the generation of a time period measurement start command of the mentioned main CPU; a timer start time period setting memory 311b storing and memorizing a set time period from the mentioned main CPU; comparison determination output means 312 for generating an arousal output signal WUP when an elapsed time period corresponding to a current value having been timed of the mentioned timing counter 310 has reached a set time period from a main CPU that is stored in the mentioned timer start time period setting memory 311b; output logic processing means 313 for generating a circuit-closing drive output PWP for closing the circuit of a switching element 141 that is provided between the mentioned main power supply circuit 114a and the on-vehicle battery 101 in response to the mentioned arousal output signal WUP; and flashing display output means 320 for driving a display element 106 to flash in a first cycle during a time period of the mentioned timing counter 310 measuring an elapsed time period from the interruption of the mentioned main power supply circuit 114a.

The mentioned display element 106 is mounted at a position visible at least for a driver of a vehicle, and announces that the mentioned timer circuit section 120b is in an operable state; and the mentioned display element 106 is located in a position visible also from outside the vehicle and functions as threatening display means for the purpose of preventing the theft of a parking vehicle.

As a result, a driver of the vehicle can recognize that the timer circuit section 120a is in the operable state started by the timer. In addition, the display element 106 indicating that the timer circuit section 120b is in the operation mode serves also as a threatening display element for preventing the theft, thereby leading to an advantage that increase in power consumption can be suppressed.

The mentioned timer circuit section 120b includes a microprocessor acting as a sub CPU 121a operative in cooperation with a second program memory 121e, a timer start time period setting memory 311b storing and memorizing a set time period from the mentioned main CPU, and a flashing cycle setting memory 325b storing and memorizing the mentioned flashing time period cycle and a set value changing means 908; and the mentioned sub CPU 121a and the mentioned main CPU 111a are arranged so as to communicate with each other through a serial communication circuits 111d · 121d. At least a set time period from the main CPU that is stored in the mentioned timer start time period setting memory 311b and a flashing cycle that is stored in a flashing cycle setting memory 325b are transmitted from the mentioned main CPU 111a via the mentioned serial communication circuits 111d · 121d.

The mentioned set value changing means 908 sets a final start target time period longer than before, after one or plural times of operations started by the timer have completed, sets and changes a flashing cycle of the mentioned display element 106 to a second periodic time longer than a first periodic time during a period until the completion of an arousal operation corresponding to the mentioned final set time period, and identifies and announces whether the mentioned timer circuit section 120b is in a normal start operation stage or a final start stage.

As a result, an advantage exits in that it is possible to continue the threatening display while lengthening a flashing cycle to reduce power consumption even in the case of leaving an on-vehicle electronic control device for a long time period after the completion of the normal arousal operation. Further, the flashing display is stopped after the completion of the final arousal operation set to be that for a long time period, leading to an advantage that the discharge of the on-vehicle battery 101 can be suppressed.

The mentioned on-vehicle electronic control device 100b further includes a first and second power feed circuits. The mentioned first power feed circuit is provided with: a power supply relay having an output contact 104b acting as a first switching element that is connected between the mentioned main power supply circuit 114a and various current consumers 105 and an on-vehicle battery 101, and an electromagnetic coil 103b driving the mentioned output contact 104b to in a closed circuit; and a reverse-current inhibiting diode 140 that is connected in series to the mentioned output contact 104b. The mentioned electromagnetic coil 103b is a power feed circuit that is energized upon the fact that a power supply switch 102 to be operated at the time of driving a vehicle is in a closed circuit, and is held in operation with an output permitting signal OUTE coming to be active when a generation cycle of the watchdog clear signal WD1 that the mentioned main CPU 111a generates is not more than a predetermined time period, or with a self-holding drive signal DR that the mentioned main CPU 111a generates.

The mentioned second power feed circuit is provided with a second switching element 141 for a connection between the mentioned main power supply circuit 114a and an on-vehicle battery 101. The mentioned second switching element 141 is a power feed circuit that is brought in a closed circuit responsive to the generation of the mentioned arousal output signal WUP, is maintained in a closed circuit by closed-circuit continuing means of any first, second and third closed-circuit continuing means, and is brought in an open circuit when the mentioned closed-circuit continuing means is inoperative.

The mentioned first closed-circuit continuing means is that by which the mentioned timer circuit section 120b continues the generation of a circuit-closing drive output PWP until the generation of a stop command from the mentioned main CPU 111a having been started by the timer circuit section. The mentioned second closed-circuit continuing means is that which is replaced with the self-holding drive signal DR that the mentioned main CPU 111a generates after the start of the mentioned main CPU 111a by means of the timer circuit section. The mentioned third closed-circuit continuing means is that which is replaced with the output permitting signal OUTE coming to be active when a generation cycle of the watchdog clear signal WD1 that the mentioned main CPU 111a generates after the start of the mentioned main CPU 111a by means of the timer circuit section is not more than a predetermined time period.

The mentioned reverse-current inhibiting diode 140 is connected to establish such a relation as to enable a power feed from a first switching element 104b to various current consumers 105, however, to inhibit a power feed from a second switching element 141 to various current consumers 105.

As a result, an advantage exists in that the main CPU 111a continues to be fed with an electric power with the self-holding drive signal DR or the output-permitting signal OUTE to be capable of carrying out a preparation operation for the arousal control even after the interruption of the power supply switch 102. A further advantage exists in that it is possible for the main CPU 111a to control a time period of operation started by the timer accompanied by the generation of the arousal output signal WUP; and that it is possible to interrupt the main power supply circuit 114a immediately after the completion of start preparing operation or the operation started by the timer eventually resulting in saving an electricity of the on-vehicle battery 101.

Furthermore, the first switching element 104b is in an open circuit at the operation started by the timer, so that an electric power is not fed to the various current consumers 105 that are connected to the first switching element 104b. Consequently, an advantage exists in that it is possible to prevent an unnecessary increase in power consumption.

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. An on-vehicle electronic control device including:
a main control circuit section fed with electric power by a main power supply circuit via a controllable switching element from an on-vehicle battery, and driving current consumers in accordance with an operation state of input sensors and contents of a first program memory; and
a timer circuit section fed with electric power at all times via a sub power supply circuit from said on-vehicle battery, said timer circuit section measuring a time period of interruption of said main power supply circuit, and generating an arousal output signal to connect said main power supply circuit to said on-vehicle battery when said measured time period has reached a predetermined arousal target time, wherein said timer circuit section comprises:

a timing counter for counting a clock signal generated by a timing clock signal generation circuit, and measuring an elapsed time period from the interruption of said main power supply circuit, in response to a start operation command from said main control circuit section;

a timer start time period setting memory for storing and memorizing said predetermined arousal target time;

comparison determination output means for generating said arousal output signal when said elapsed time period measured by said timing counter has reached said arousal target time of said timer start time period setting memory;

output logic processing means for storing the generation of said arousal output signal, and generating a circuit-closing drive output to close the circuit of said controllable switching element provides between said main power supply circuit and said on-vehicle battery at the time the storage of said arousal output signal; and first and second reset means for erasing a storage content of said output logic processing means;

wherein said first reset means is a forced stop command means for carrying out reset by a main CPU of which arousal has been started; and said second reset means is a self-reset means that operates when the reset by said first reset means is not carried out by the time a predetermined time period has passed since the generation of said arousal output signal, and resets the storage of said output logic processing means.

2. The on-vehicle electronic control device according to claim 1, wherein a circuit-closing drive output generated by said output logic processing means comprises: first and second drive outputs; wherein control is performed such that when said first drive output is at a logic level "H" and said second drive output is at a logic level "L", said controllable switching element is brought into a closed circuit state, and such that when said controllable switching element is brought into an open circuit state, said first drive output is at a logic level "L" or at a logic level "X", and a second drive output is at a logic level "H" or at a logic level "X".

3. The on-vehicle electronic control device according to claim 1, wherein said main CPU is provided with forced operation command means for carrying out diagnosis with respect to a sub CPU during a period when said main CPU is fed with electric power from said main power supply circuit and operates normally; and said main CPU is provided with a monitor input terminal and forced operation monitoring means; and said monitor input terminal is a terminal for inputting a state of circuit-closing drive outputs generated by said output logic processing means, as monitoring information to said main CPU; and said forced operation monitoring means is a means for carrying out an operation diagnosis of said output logic processing means by monitoring the operation state of said monitor input terminal in response to a simulated arousal output signal generated by said forced operation command means and a reset signal generated by said first or second reset means.

4. The on-vehicle electronic control device according to claim 1, wherein said main CPU is provided with an operation inspecting command means for accelerating the generation of an inspection signal with respect to said timer circuit section with a predetermined simulated target time period, during said main CPU being fed with electric power from the main power supply circuit and being normally operated; and said main CPU is provided with a monitor input terminal and an operation inspecting monitoring means; and said monitor input terminal comprises a terminal for inputting a circuit-closing drive output generated by said output logic processing means as monitoring information for said main CPU based on said operation inspecting command means; and said operation inspecting monitoring means comprises means for carrying out a start operation inspection of said timer circuit section by monitoring an operation state of said monitor input terminal in response to the inspection signal generated by the operation inspecting command means and a reset signal generated by said first or second reset means.

5. The on-vehicle electronic control device according to claim 4, wherein said timer circuit section and said main control circuit section are arranged so as to communicate with each other through a serial communication circuit; the arousal target time stored in the timer start time period setting memory of said timer circuit section is transmitted from said main CPU via said serial communication circuit; and said main CPU is provided with measurement means of a simulated start time and compensation coefficient operation means with respect to said arousal target time period; and wherein said measurement means comprises means for measuring an elapsed time period τ1 from the generation of an operation inspection command by said main CPU to said timer circuit section, until the generation of a circuit-closing drive output by said timer circuit section; and said compensation coefficient operation means comprises means for calculating a ratio K=τ2/τ1 between an operation inspection time period τ2 applied at said timer circuit section and an elapsed time period τ1 until a circuit-closing drive output is generated by said timer circuit section; and a compensation arousal target time T to be transmitted to said timer circuit section is compensated by T=TO×K with respect to an arousal target time TO actually required.

6. The on-vehicle electronic control device according to claim 3, wherein said timer circuit section is provided with said sub CPU operative in cooperation with a second program memory; said sub CPU and said main CPU are arranged to communicate with each other through a serial communication circuit;

and the arousal target time stored in a timer start time period setting memory of said timer circuit section is transmitted from said main CPU via said serial communication circuit, while a monitor input monitoring a circuit-closing drive output that causes said main CPU to start is inputted to said main CPU via a monitor input terminal non-dependent on said serial communication circuit.

7. The on-vehicle electronic control device according to claim 1, wherein the controllable switching element provided between the on-vehicle battery and the main power supply circuit is an output contact of a power supply relay in which an electromagnetic coil is driven into a closed circuit state by an OR output of first, second, and third drive signals; said first drive signal is a drive signal made active or reactive in response to the turning-on or interruption of a power supply switch brought into a closed circuit state at the operation of the vehicle; said second drive signal is an output for permitting a signal to be active when a generation cycle of a watchdog clear signal that said main CPU generates is not more than a predetermined time period, or is a self-holding drive signal that said main CPU generates; and said third drive signal comprises circuit-closing drive signals that said timer circuit section generates; and an output of said circuit-closing drive outputs is stopped after said main CPU has been started with said third drive signal, and a circuit-closing operation of said switching element is held with said second drive signal instead of said third drive signal, or a third drive signal continues to be generated and an output thereof is stopped by said main CPU.

8. The on-vehicle electronic control device according to claim 1, wherein said on-vehicle electronic control device is provided with a first and second power feed circuit, said first power feed circuit comprising said main power supply circuit, a power supply relay including an output contact acting as a first controllable switching element connected between said current consumers and the on-vehicle battery and an electromagnetic coil driving said output contact into a closed circuit state, and a reverse-current inhibiting diode that is connected in series to said output contact; said electromagnetic coil comprising a power feed circuit energized in response to a power supply switch that is operated at the time of driving a vehicle, and that is held in operation with an output permitting signal active when a generation cycle of a watchdog clear signal that said main CPU generates is not more than a predetermined time period, or with a self-holding drive signal that said main CPU generates;

said second power feed circuit is provided with a second controllable switching element providing a connection between said main power supply circuit and the on-vehicle battery; said second controllable switching element comprising a power feed circuit brought into a closed circuit state responsive to the generation of a circuit-closing drive output causing said main CPU to start by said timer circuit section and that is maintained in a closed circuit state by closed-circuit continuing means of any of first, second and third closed-circuit continuing means, and is brought into an open circuit state when said closed-circuit continuing means is inoperative; said first closed-circuit continuing means comprising means by which said timer circuit section continues the generation of a circuit-closing drive output until a stop command from said main CPU, said second closed-circuit continuing means comprising means which is replaced with a self-holding drive signal that said main CPU generates at the start of said main CPU by said timer circuit section; and said third closed-circuit continuing means comprising means which is replaced with an output permitting signal coming active when a generation cycle of a watchdog clear signal that said main CPU generates is not more than a predetermined time period at the start of said main CPU by said timer circuit section; and said reverse-current inhibiting diode is connected so as to enable a power feed from a first controllable switching element to current consumers, and to inhibit a power feed from a second controllable switching element to the various current consumers.

9. The on-vehicle electronic control device according to claim 1, wherein said timer circuit section is provided with flashing display output means for driving a display element to flash in a first cycle at a predetermined time from the interruption of an operation power supply of said main control circuit section to the resupply of power;

said display element is located at a position visible by a driver of a vehicle and announces that said timer circuit section is in an operable state; and said display element is located at a position visible also from outside the vehicle and functions as a threatening display element for preventing theft of a parked vehicle.

10. The on-vehicle electronic control device according to claim 9, wherein said flashing display output means is further provided with continuous drive means for continuously driving said display element to flash in a second cycle after a predetermined time period has passed since the interruption of the main power supply circuit and said timer circuit section has completed the generation of circuit-closing drive outputs causing said main CPU to start; and said second cycle is longer than said first cycle, and said flashing display output means identifies and announces whether said timer circuit section is in an operable state or a non-operative state.

11. The on-vehicle electronic control device according to claim 9, wherein said timer circuit section is further provided with a sub CPU operative in cooperation with a second program memory, said timer start time period setting memory for storing and memorizing an arousal target time that causes said main CPU to start, a flashing cycle setting memory for storing and memorizing a flashing time period cycle, and set value changing means; said sub CPU and said main CPU being arranged so as to communicate with each other through a serial communication circuit; the arousal target time stored in said timer start time period setting memory and said flashing cycle stored in said flashing cycle setting memory being transmitted from said main CPU via said serial communication circuit; and wherein said set value changing means sets a longer final arousal target time, after one or plural times of circuit-closing drive outputs by said main CPU have completed, sets and changes the flashing cycle of said display element to a second periodic time longer than a first periodic time during a period until the completion of operation of circuit-closing drive outputs corresponding to said final arousal target time, and identifies and announces the stage of said timer circuit section.

12. The on-vehicle electronic control device according to claim 9, wherein the controllable switching element that is provided between the on-vehicle battery and the main power supply circuit is an output contact of a power supply relay in which an electromagnetic coil is driven into a closed circuit state by an OR output of first, second, and third drive signals; said first drive signal comprising a drive signal active or reactive in response to the turning-on or interruption of a power supply switch to be brought in a closed circuit at the operation of a vehicle; said second drive signal comprising an output for permitting a signal to be active when a generation cycle of a watchdog clear signal that said main CPU generates is not more than a predetermined time period, or a self-holding drive signal that said main CPU generates; and said third drive signal comprises circuit-closing drive signals that said timer circuit section generates; and wherein an output of said circuit-closing drive outputs is stopped after said main CPU has been started with said third drive signal, and a circuit-closing operation of said switching element is held with said second drive signal instead of said third signal, or said third drive signal continues to be generated and an output thereof is stopped by said main CPU.

13. The on-vehicle electronic control device according to claim 9, wherein said on-vehicle electronic control device is provided with a first and second power feed circuit, said first power feed circuit comprising said main power supply circuit, a power supply relay including an output contact acting as a first controllable switching element that is connected between said current consumers and the on-vehicle battery and an electromagnetic coil driving said output contact into a closed circuit, and a reverse-current inhibiting diode that is connected in series to said output contact; said electromagnetic coil comprising a power feed circuit energized in response to a power supply switch being operated at the time of driving a vehicle, and held in operation with an output permitting signal coming active when a generation cycle of a watchdog clear signal that said main CPU generates is not more than a predetermined time period, or with a self-holding drive signal that said main CPU generates; said second power feed circuit is provided with a second controllable switching element providing a connection between said main power supply circuit and the on-vehicle battery; and said second controllable switching element is a power feed circuit that is brought in a closed circuit state responsive to the generation of a circuit-closing drive output causing said main CPU to start by said timer circuit section and that is maintained in a closed circuit by closed-circuit continuing means of any of first, second and third closed-circuit continuing means, and is brought in an open circuit when said closed-circuit continuing means is inoperative; said first closed-circuit continuing means comprising means by which said timer circuit section continues the generation of a circuit-closing drive output until a stop command from said main CPU, said second closed-circuit continuing means comprising means which is replaced with a self-holding drive signal that said main CPU generates at the start of said main CPU by said timer circuit section; and said third closed-circuit continuing means comprising means which is replaced with an output permitting signal coming active when a generation cycle of a watchdog clear signal that said main CPU generates is not more than a predetermined time period at the start of said main CPU by said timer circuit section; and said reverse-current inhibiting diode is connected in so as to enable a power feed from a first controllable switching element to current consumers, and to inhibit a power feed from a second controllable switching element to the various current consumers.

* * * * *